(12) United States Patent
Kim et al.

(10) Patent No.: US 9,718,695 B2
(45) Date of Patent: Aug. 1, 2017

(54) VISIBLE LIGHT SENSITIVE PHOTOCATALYST, METHOD OF PRODUCING THE SAME, AND ELECTROCHEMICAL WATER DECOMPOSITION CELL, WATER DECOMPOSITION SYSTEM, AND ORGANIC MATERIAL DECOMPOSITION SYSTEM EACH INCLUDING THE SAME

(75) Inventors: Tae-gon Kim, Seoul (KR); Tae-hyung Kim, Seoul (KR); Seoung-jae Im, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 905 days.

(21) Appl. No.: 13/517,766

(22) Filed: Jun. 14, 2012

(65) Prior Publication Data
US 2012/0322648 A1    Dec. 20, 2012

(30) Foreign Application Priority Data

Jun. 15, 2011  (KR) .................. 10-2011-0057972
May 31, 2012  (KR) .................. 10-2012-0058811

(51) Int. Cl.
*C01B 33/20*  (2006.01)
*B01J 19/12*  (2006.01)
(Continued)

(52) U.S. Cl.
CPC ............. *C01B 33/20* (2013.01); *B01J 19/123* (2013.01); *B01J 23/50* (2013.01); *B01J 23/66* (2013.01); *B01J 27/25* (2013.01); *B01J 35/004* (2013.01); *B01J 37/0081* (2013.01); *B01J 37/30* (2013.01); *C25B 1/003* (2013.01); *B01J 23/52* (2013.01);
(Continued)

(58) Field of Classification Search
CPC .. C01B 33/20; B01J 19/23; B01J 23/50; B01J 23/66; B01J 27/25; B01J 35/004; B01J 37/0081; B01J 37/30; C25B 1/003
See application file for complete search history.

(56) References Cited

U.S. PATENT DOCUMENTS 5,872,072 A    2/1999  Mouri et al.
8,603,936 B2   12/2013 Cho et al.

FOREIGN PATENT DOCUMENTS

JP           02215704 A  *  8/1990
JP        2004-066028 A     3/2004
(Continued)

OTHER PUBLICATIONS

Cui et al(Fabrication of Ag2SiO3/SiO2 Composite Nanotubes Using a One-Step Sacrificial Templating Solution Approach, Adv. Mater. (2004), 16, No. 13, pp. 1109-1112).*
(Continued)

*Primary Examiner* — Melvin C Mayes
*Assistant Examiner* — Michael Forrest
(74) *Attorney, Agent, or Firm* — Cantor Colburn LLP

(57) ABSTRACT

A visible light sensitive photocatalyst including a compound represented by Formula 1:

$$A_{a-x}M^1{}_x Si_{b-y} M^2{}_y O_c \qquad \text{Formula 1}$$

wherein A is one or more metals selected from Ag, Cu, and Au; $M^1$ is one or more metals selected from Li, Na, K, Rb, and Cs; $M^2$ is one or more metals selected from Ge, Sn, Ti, Zr, and Hf, and $1.7 \leq a \leq 2.3$, $0.7 \leq b \leq 1.3$, $2.7 \leq c \leq 3.3$, $0 \leq x < a$, and $0 \leq y < b$.

26 Claims, 18 Drawing Sheets

(51) Int. Cl.
  *B01J 23/66* (2006.01)
  *B01J 23/50* (2006.01)
  *B01J 35/00* (2006.01)
  *B01J 37/30* (2006.01)
  *C25B 1/00* (2006.01)
  *B01J 23/72* (2006.01)
  *B01J 37/08* (2006.01)
  *B01J 37/02* (2006.01)
  *B01J 23/52* (2006.01)
  *B01J 27/25* (2006.01)
  *B01J 37/00* (2006.01)

(52) U.S. Cl.
  CPC ............ *B01J 23/72* (2013.01); *B01J 37/0215* (2013.01); *B01J 37/08* (2013.01); *B01J 2219/0877* (2013.01); *B01J 2219/0892* (2013.01); *C02F 2305/10* (2013.01); *Y02W 10/37* (2015.05)

(56) References Cited

FOREIGN PATENT DOCUMENTS

| | | |
|---|---|---|
| JP | 2008-006344 A | 1/2008 |
| KR | 100486388 A | 4/2005 |
| KR | 10-0945035 B1 | 2/2010 |

OTHER PUBLICATIONS

Lou et al (One-Step Synthesis of Amorphous Silver Silicates with Tunable Light Absorption Spectra and Photocatalytic Activities in the Visible Region, Chem Euro J. (2015), 21, 8706-8710).*

S. Ouyang et al., Effective decolorizations and mineralizations of organic dyes over a silver germanium oxide photocatalyst under indoor-illumination irradiation, Applied Catalysis A: General 366 (2009) 309-314.

Z. Yi et al., An orthophosphate semiconductor with photooxidation properties under visible-light irridation, Nature Materials, Letters, Advance Online Publication, Jun. 6, 2010, pp. 1-6.

International Search Report for PCT/KR2012/004689 mailed Jan. 23, 2013.

Written Opinion of the International Searching Authority for PCT/KR2012/004689 mailed Jan. 23, 2013.

* cited by examiner

EXAMPLE 4
($Ag_2SiO_3$)

COMPARATIVE
EXAMPLE 1
($TiO_2$)

VISIBLE LIGHT SENSITIVE PHOTOCATALYST, METHOD OF PRODUCING THE SAME, AND ELECTROCHEMICAL WATER DECOMPOSITION CELL, WATER DECOMPOSITION SYSTEM, AND ORGANIC MATERIAL DECOMPOSITION SYSTEM EACH INCLUDING THE SAME

CROSS-REFERENCE TO RELATED APPLICATIONS

This application claims priority to Korean Patent Application No. 10-2011-0057972, filed on Jun. 15, 2011, and Korean Patent Application No. 10-2012-0058811, filed on May 31, 2012, and all the benefits accruing therefrom under 35 U.S.C. §119, the contents of which in their entirety are herein incorporated by reference.

BACKGROUND

1. Field

The present disclosure relates to a visible light sensitive photocatalyst, and in particular, to a visible light sensitive photocatalyst capable of decomposing water, a method of producing the visible light sensitive photocatalyst, and an electrochemical water decomposition cell, a water decomposition system, and an organic material decomposition system, each including the visible light sensitive photocatalyst.

2. Description of the Related Art

When a photocatalyst receives light having an energy level equal to or greater than a band gap energy, electrons are excited from a valence band to a conduction band, and thus electrons are disposed in the conduction band and holes are formed in the valence band. The electrons and holes may diffuse to a surface of the photocatalyst and participate in oxidation and reduction reactions.

Photocatalysis is used to directly decompose water using solar energy to generate hydrogen, and is an alternative next-generation energy source. Photocatalysis may also be used to decompose volatile organic compounds ("VOC"s), offensive odors, waste water, decomposable refractory contamination materials, and environmental hormones, and to sterilize germs and bacteria. Accordingly, a photocatalyst technology that uses only solar energy at room temperature is useful for producing hydrogen and for cleaning environments, and photocatalyst technology is receiving attention for use as a powerful method for resolving environmental problems.

Titanium dioxide ($TiO_2$) is used commercially as a photocatalyst, and has excellent organic material and water decomposition characteristics. However, titanium dioxide ($TiO_2$) induces photocatalysis only in response to ultraviolet light, which accounts for about 4% of solar light. Accordingly, to effectively use the photocatalyst technology, there is a need to develop a photocatalyst material having improved visible light activity that effectively uses visible light that accounts for about 43% of solar light.

SUMMARY

Provided is a visible light sensitive photocatalyst that has improved visible light absorption, has reduced charge transmission loss, and can decompose water.

Provided are methods of producing a powder or a film of the visible light sensitive photocatalyst.

Provided is an electrochemical water decomposition cell, a water decomposition system, and an organic material decomposition system, each including the visible light sensitive photocatalyst.

Additional, features, advantages, and aspects will be set forth in part in the description which follows and, in part, will be apparent from the description.

According to an aspect, a visible light sensitive photocatalyst includes a compound represented by Formula 1:

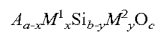

$$A_{a-x}M^1{}_xSi_{b-y}M^2{}_yO_c \qquad \text{Formula 1}$$

wherein A is one or more metals selected from Ag, Cu, and Au, $M^1$ is one or more metals selected from Li, Na, K, Rb, and Cs, $M^2$ is one or more metals selected from Ge, Sn, Ti, Zr, and Hf, and $1.7 \leq a \leq 2.3$, $0.7 \leq b \leq 1.3$, $2.7 \leq c \leq 3.3$, $0 \leq x < a$, and $0 \leq y < b$.

A band gap energy of the compound of Formula 1 may be from about 2 to about 3 eV.

An energy level of a valence band of the compound of Formula 1 may be about 0.5 to about 3 V higher than an oxidation potential ($OH^-/O_2$) of water. A Fermi energy of the compound represented by Formula 1 may be present between an energy level of the valence band and the energy level of a conduction band.

The compound of Formula 1 may have an orthorhombic crystal structure. In the compound of Formula 1, a distance between adjacent A atoms, a distance between a first A atom and a first $M^1$ atom, or a distance between adjacent $M^1$ atoms is smaller than a corresponding Van der Waals distance therebetween.

An electron effective mass $m_e^*$ of the compound of Formula 1 may satisfy the inequality $0.3 \times m_0 \leq m_e^* \leq 1.5 \times m_0$ wherein $m_0$ is a rest mass of a free electron. A hole effective mass $m_h^*$ of the compound of Formula 1 may satisfy the inequality $2 \times m_0 \leq m_h^* \leq 5 \times m_0$ wherein $m_0$ is the rest mass of a free electron.

The compound of Formula 1 may be $Ag_2Si_{b-y}Ge_yO_3$, wherein $0.9 \leq b \leq 1.1$ and $0 \leq y < 0.4$.

The compound of Formula 1 may be $Ag_2SiO_3$.

According to another aspect, a method of producing a visible light sensitive photocatalyst includes: combining $BaCO_3$ and $SiO_2$ to prepare a $BaSiO_3$; combining the $BaSiO_3$ and $AgNO_3$ to provide a mixture; and heating and ion-exchanging the mixture to produce the light sensitive photocatalyst. The heating of the mixture powder including $BaSiO_3$ and $AgNO_3$ may be conducted in air at a temperature of about 290 to about 350° C. for about 5 to about 100 hours.

According to another aspect, a method of producing a visible light sensitive photocatalyst film includes: preparing a $BaSiO_3$ paste; disposing the $BaSiO_3$ paste on a substrate; heat-treating the substrate and the $BaSiO_3$ paste to provide a heat-treated substrate; disposing $AgNO_3$ on the heat-treated substrate; and heat-treating the substrate and the $AgNO_3$ to produce the light sensitive photocatalyst film. The preparing of the $BaSiO_3$ paste may include combining $BaSiO_3$ and a terpineol mixture including about 0.1 to about 20 weight percent (wt %) of ethyl cellulose ("EC"), based on a total weight of the terpineol mixture. The heat-treating of the substrate and the $AgNO_3$ may include heating the substrate and the $AgNO_3$ in air at a temperature of about 290 to about 350° C. for about 5 to about 100 hours.

According to another aspect, an electrochemical water decomposition cell includes the visible light sensitive photocatalyst described above, and a counter electrode.

According to another aspect, a water splitting system includes a transparent case, an aqueous solution in the transparent case, wherein the aqueous solution includes the visible light sensitive photocatalyst described above; and a light source for irradiating white light into the aqueous solution.

According to another aspect, an organic material decomposition system includes a transparent case; a solution in the transparent case, the solution including an organic material and the visible light sensitive photocatalyst described above; and a light source for irradiating white light into the solution.

In another aspect, disclosed is a light sensitive photocatalyst including: a first metal, wherein the first metal is one or more metals selected from Li, Na, K, Rb, and Cs; a second metal, wherein the second metal is one or more metals selected from Ag, Cu, and Au; a third metal, wherein the third metal is one or more metals selected from Ge, Sn, Ti, Zr, and Hf; Si; and oxygen, wherein each mole of the photocatalyst includes x moles of the first metal, (a-x) moles of the second metal, y moles of the third metal, (b-y) moles of the Si, and c moles of the oxygen, wherein $1.7 \leq a \leq 2.3$, $0.7 \leq b \leq 1.3$, $2.7 \leq c \leq 3.3$, $0 \leq x < a$, and $0 \leq y < b$.

Also disclosed is a visible light sensitive photocatalyst including a compound represented by Formula 2:

Formula 2 wherein $M^3$ is one or more metals selected from Cu, Li, Na, K, Rb, and Cs, $M^4$ is one or more metals selected from Ge, Sn, Ti, Zr, and Hf, and $8.5 \leq d \leq 9.5$, $1.7 \leq e \leq 2.3$, $0.7 \leq f \leq 1.3$, $10.2 \leq g \leq 11.8$, $0 \leq p < d$ and $0 \leq q < e$.

In another aspect, disclosed is a water splitting composition including: the light sensitive photocatalyst of claim 1; water; and a sacrificial reagent, wherein the sacrificial reagent is one or more selected from $AgNO_3$, $FeCl_3$, $Fe(NO_3)_3$, $Na_2S_2O_8$, $Ce(SO_4)_2$, $HgCl_2$, $Na_3PW_{12}O_{40}$, and $Na_3PMo_{12}O_{40}$.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1A:
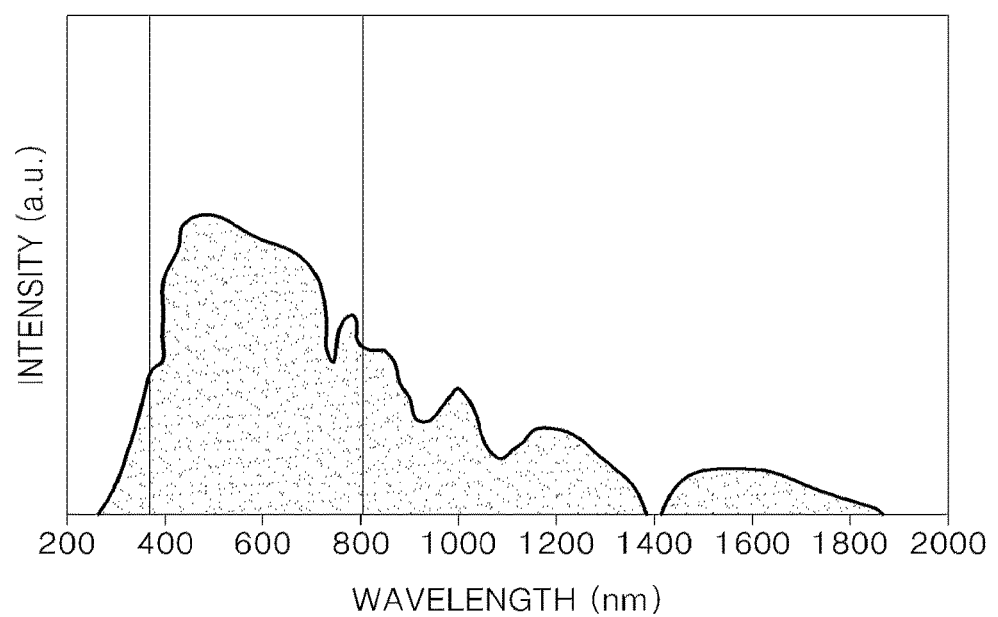
FIG. 1A illustrates a spectrum of solar light.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items. Or means "and/or."

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer or section from another element, component, region, layer or section. Thus, "a first element," "component," "region," "layer," or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, a visible light sensitive photocatalyst according to an embodiment will now be disclosed in further detail. In an embodiment, the light sensitive photocatalyst is sensitive to visible light.

A visible light sensitive photocatalyst may include a compound represented by Formula 1:

$$A_{a-x}M^1_x Si_{b-y}M^2_y O_c \qquad \text{Formula 1}$$

wherein A is one or more metals selected from Ag, Cu, and Au, $M^1$ includes one or more metals selected from Li, Na, K, Rb, and Cs, $M^2$ includes one or more metals selected from Ge, Sn, Ti, Zr, and Hf, and $1.7 \leq a \leq 2.3$, $0.7 \leq b \leq 1.3$, $2.7 \leq c \leq 3.3$, $0 \leq x < a$, and $0 \leq y < b$.

In another embodiment, disclosed is light sensitive photocatalyst comprising: a first metal, wherein the first metal is one or more metals selected from Li, Na, K, Rb, and Cs; a second metal, wherein the second metal is one or more metals selected from Ag, Cu, and Au; a third metal, wherein the third metal is one or more metals selected from Ge, Sn, Ti, Zr, and Hf; Si; and oxygen, wherein each mole of the photocatalyst comprises x moles of the first metal, (a-x) moles of the second metal, y moles fraction of the third metal, (b-y) moles of the Si, and c moles of the oxygen, wherein $1.7 \leq a \leq 2.3$, $0.7 \leq b \leq 1.3$, $2.7 \leq c \leq 3.3$, $0 \leq x < a$, and $0 \leq y < b$.

The visible light sensitive photocatalyst may comprise a compound represented by Formula 2:

$$Ag_{d-p}M^3_p Si_{e-q}M^4_q N_f O_g \qquad \text{Formula 2}$$

wherein $M^3$ is one or more metals selected from Cu, Li, Na, K, Rb, and Cs, $M^4$ is one or more metals selected from Ge, Sn, Ti, Zr, and Hf, and $8.5 \leq d \leq 9.5$, $1.7 \leq e \leq 2.3$, $0.7 \leq f \leq 1.3$, $10.2 \leq g \leq 11.8$, $0 \leq p < d$ and $0 \leq q < e$.

To increase an efficiency of a photocatalyst, it can be desirable to increase an efficiency of absorption of visible light, because visible light accounts for about half of solar light, and to increase an efficiency of transfer of electrons and holes generated by absorbing light energy.

Figure 1B:
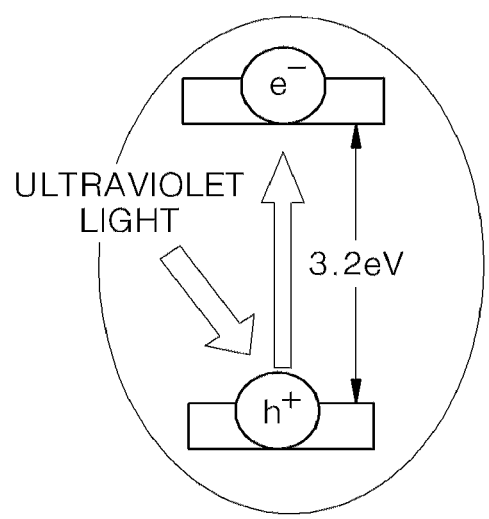
FIGS. 1B and 1C illustrate band gap energy levels corresponding to an ultraviolet light region and a visible light region of solar light, respectively.
Figure 1C:
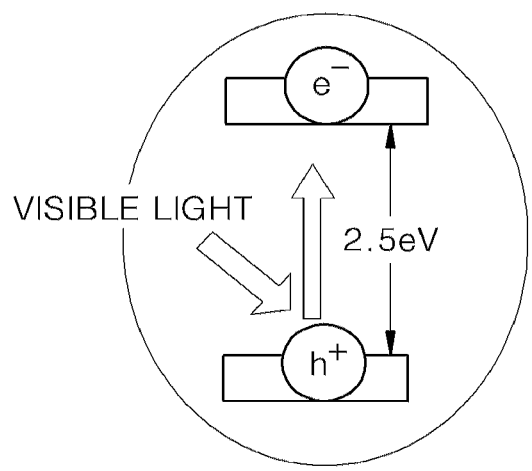

FIG. 1A illustrates a spectrum of solar light, and FIGS. 1B and 1C, illustrate band gap energy levels corresponding to light having wavelengths in an ultraviolet light region and a visible light region, respectively. Referring to FIG. 1A, the spectrum of solar light includes ultraviolet light having a wavelength of about 200 to about 400 nanometers (nm), visible light having a wavelength of about 400 to about 750 nm, and infrared light having a wavelength of about 750 nm or more. Ultraviolet light accounts for a very small portion of solar light, and visible light and the infrared light account for most of solar light. As illustrated in FIG. 1B, and while not wanting to be bound by theory, a material having a high band gap energy, e.g., a band gap energy of about 3.2 electron volts (eV), absorbs only ultraviolet light. Accordingly, to absorb visible light, there is a need to develop a material having a lower band gap energy, e.g., a band gap energy of about 3.1 eV, or lower.

To absorb visible light, a photocatalyst desirably has a band gap energy corresponding to visible light. While not wanting to be bound by theory, it is understood that the visible light sensitive photocatalyst of Formula 1 may have a band gap energy of about 2 to about 3 eV, and thus absorbs, in addition to ultraviolet light, visible light having a wavelength of about 420 to about 620 nm to induce a catalytic reaction. Also, the compound of Formula 1 may include an n-type semiconductor.

Also, electrons and holes, which may be generated by absorption of visible light by the photocatalyst, may move to a surface of the photocatalyst where the electrons and holes may participate in a reaction. To allow more electrons and holes to move to the surface of the photocatalyst, loss of generated electrons and holes is desirably minimized, and the mobility of the electrons and holes is desirably high.

In an embodiment, and while not wanting to be bound by theory, the visible light sensitive photocatalyst of Formula 1 has an orthorhombic crystal structure in which metallic atoms are so close that a distance between the metallic atoms is equal to or lower than a Van der Waals distance. Thus, electron orbitals may overlap and the mobility of electrons and holes may be improved due to the overlap of the electron orbitals.

Also, electrons and holes that have a relatively low effective mass (m*) have a relatively high mobility. An effective mass ($m_e$*) of an electron of the visible light sensitive photocatalyst may satisfy the inequality $0.3 \times m_0 \leq m_e^* \leq 1.5 \times m_0$, wherein $m_0$ is the rest mass of a free electron. Also, an effective mass ($m_h^*$) of a hole of the visible light sensitive photocatalyst may satisfy the inequality $2 \times m_0 \leq m_h^* \leq 6 \times m_0$, wherein $m_0$ is the rest mass of a free electron. In consideration that an effective mass of an electron of rutile titanium dioxide (TiO$_2$) is about 1.5 $m_0$, and an effective mass of an electron of anatase titanium dioxide (TiO$_2$) is about 3 to about 30 $m_0$, the effective masses of electrons and holes of the visible light sensitive photocatalyst of Formula 1 are respectively lower than those of rutile titanium dioxide and anatase titanium dioxide. Accordingly, and while not wanting to be bound by theory, from the effective masses of electrons and holes of the visible light sensitive photocatalyst of Formula 1, it may be understood that a mobility of electrons and holes of the visible light sensitive photocatalyst of Formula 1 is very high. Due to the high mobility of electrons and holes of the visible light sensitive photocatalyst of Formula 1, electrons and holes generated by absorbing light may move to a surface of the visible light sensitive photocatalyst with reduced loss, and thus the efficiency of the visible light sensitive photocatalyst may be further improved.

Also, to photolyze water without application of a voltage from the outside, a band gap energy of a photocatalyst is desirably higher than an electrolytic voltage of water (theoretical value of 1.23 V), a valence band of the photocatalyst desirably has a potential higher than a potential at which oxygen is generated from water, or a conduction band of the photocatalyst desirably has a potential lower than a potential at which hydrogen is generated.

Since a valence band of the visible light sensitive photocatalyst of Formula 1 has an energy which is distinct from the potential at which oxygen is generated from water, due to the band gap energy of the visible light sensitive photocatalyst of Formula 1, the visible light sensitive photocatalyst has a high overpotential with respect to a reaction for generating oxygen from water. The high overpotential substantially or effectively prevents recombination of electrons and holes, regardless of various energy loss conditions which may be present in the light sensitive photocatalyst and at the surface of the visible light sensitive photocatalyst, and thus the efficiency of the visible light sensitive photocatalyst may be increased. Accordingly, holes generated at the valence band may oxidize water or an organic material with improved efficiency. However, since the conduction band of the visible light sensitive photocatalyst, including the visible light sensitive photocatalyst of Formula 1, has a potential that is higher than the potential at which hydrogen is generated from water, it is thermodynamically impossible to produce hydrogen.

The light sensitive photocatalyst, including the compound of Formula 1, may have an orthorhombic crystal structure. In the compound of Formula 1, a distance between adjacent A atoms, a distance between a first A atom and a first $M^1$ atom, or a distance between adjacent $M^1$ atoms, may be smaller than a corresponding Van der Waals distance therebetween.

The visible light sensitive photocatalyst, including the light sensitive photocatalyst of Formula 1 may be $Ag_2Si_{b-y}Ge_yO_3$, wherein $0.9 \leq b \leq 1.1$ and $0 \leq y < 0.4$, specifically $0.92 \leq b \leq 1.08$, and $0.02 \leq y < 0.38$, more specifically $0.94 \leq b \leq 1.06$, and $0.04 \leq y < 0.36$. For example, the visible light sensitive photocatalyst of Formula 1 may be $Ag_2SiO_3$. An embodiment wherein the light sensitive photocatalyst of Formula 1 is sensitive to visible light is specifically mentioned.

Hereinafter, a method of producing a visible light sensitive $Ag_2SiO_3$ photocatalyst will be disclosed in further detail.

An $Ag_2SiO_3$-type photocatalyst, which may be in the form of a powder, may be formed by ion exchange. First, a precursor material for ion exchange is prepared. $BaCO_3$ and $SiO_2$ are combined at a molar ratio of about 1:1, specifically about 0.8:1.2 to about 1.2:0.8, more specifically about 0.9:1.1 to about 1.1:0.9, to prepare a first mixture. The $BaCO_3$ and a $SiO_2$ may each be in the form of a powder, and each may independently have a particle size (e.g., an average largest particle size) of about 0.1 to about 100 μm, specifically about 0.5 to about 50 μm, more specifically about 1 to about 25 μm. The first mixture is heated under atmospheric conditions (e.g., in air) at a temperature of about 900 to about 1400° C., specifically about 1200 to about 1300° C., more specifically about 1250° C., for about 1 to about 100 hours, specifically about 10 hours, thereby preparing a $BaSiO_3$, which may be in the form of a powder.

The $BaSiO_3$ prepared above and $AgNO_3$ are combined at a molar ratio of about 1:2 to about 1:20, specifically about 1:4 to about 1:16, more specifically about 1:6 to about 1:12, to prepare a second mixture. The $AgNO_3$ may be in the form of a powder, and may have a particle size (e.g., an average largest particle size) of about 0.1 to about 100 μm, specifically about 0.5 to about 50 μm, more specifically about 1 to about 25 μm. The second mixture is heated under atmospheric conditions (e.g., in air) at a temperature of about 290 to about 350° C. for about 5 to about 100 hours, thereby exchanging Ba ions of $BaSiO_3$ with Ag ions of $AgNO_3$ to form a $Ag_2SiO_3$-type compound. The ion exchange is followed by washing and drying, thereby completing production of a visible light sensitive photocatalyst. An embodiment wherein the photocatalyst is $Ag_2SiO_3$ is specifically mentioned.

In an embodiment, the light sensitive photocatalyst may be in the form of a powder. The powder of the light sensitive photocatalyst may have a particle size (e.g., an average largest particle size) of about 0.1 to 100 μm, specifically 0.5 to 50 μm, more specifically 1 to 25 μm.

Hereinafter, a method of producing a visible light sensitive photocatalyst film will be disclosed in further detail.

An photocatalyst film may be formed by ion exchange. First, a dispersant is combined with a $BaSiO_3$, e.g., a $BaSiO_3$ powder, prepared as described above so as to form a $BaSiO_3$ paste. The $BaSiO_3$ paste is applied on an electrode, which is on a substrate, and then heat treated.

In this regard, the substrate may be, for example, one or more selected from a glass substrate, and a plastic substrate. Representative plastic substrates include a substrate comprising one or more selected from a polyolefin; a polyacrylate; a polyacrylonitrile, a polyamide; a polyimide; a polyester; a polycarbonate; a polyether; a halogenated polymer; and a natural polymer. Examples of the polymer may include polyoxymethylene, polyvinylnaphthalene, polyetheretherketone, a fluoropolymer, poly-α-methyl styrene, polysulfone, polyphenylene oxide, polyetherimide, polyethersulfone, polyamideimide, polyimide, polyphthalamide, polycarbonate, polyarylate, polyethylenenaphthalate, and polyethyleneterephthalate. Representative glass substrates include a substrate comprising one or more selected from borosilicate glass, quartz, and lanthanum glass. The electrode may include a conductor, and examples thereof include an $SnO_2$:F ("FTO") electrode, or an $In_2O_3$:Sn ("ITO") electrode. The $BaSiO_3$ paste may be applied to a thickness of about 1 to about 100 μm, specifically about 5 to about 20 μm, specifically about 10 to about 15 μm, on the electrode.

The heat treatment may be performed under atmospheric conditions, e.g., in air, at a temperature of about 400 to about 600° C., specifically about 450 to about 550° C., more specifically about 475 to about 525° C., for about 1 to about 10 hours, specifically about 2 hours.

$AgNO_3$, e.g., an $AgNO_3$ powder, is disposed on the $BaSiO_3$ paste layer on the electrode and then heat treated. The heat treatment may be performed under atmospheric conditions, e.g., in air, at a temperature of about 270 to about 370° C., specifically about 290 to about 350° C., more specifically about 310 to about 330° C., for about 1 to about 200 hours, specifically about 5 to about 100 hours, more specifically about 10 to about 50 hours. Due to the heat treatment, ion exchange occurs between $BaSiO_3$ and $AgNO_3$ and a layer of the photocatalyst is formed. The photocatalyst may comprise a compound of Formula 1. An embodiment wherein the photocatalyst comprises $Ag_2SiO_3$ is specifically mentioned. The ion exchange may be followed by washing and drying, thereby completing production of a visible light sensitive photocatalyst film. The light sensitive photocatalyst film may be sensitive to visible light. The photocatalyst film may comprise a compound of Formula 1. An embodiment wherein the photocatalyst film comprises $Ag_2SiO_3$ is specifically mentioned.

Hereinafter, an electrochemical water decomposition cell including the visible light sensitive photocatalyst will be disclosed in further detail.

An electrochemical water splitting cell may be built by connecting an photocatalyst film-coated working electrode, a counter electrode, and a reference electrode to a potentiostat. For example, an FTO electrode coated with an $Ag_2SiO_3$ photocatalyst film may be used as the working electrode, a platinum (Pt) mesh may be used as the counter electrode, and an Ag/AgCl electrode may be used as the reference electrode. An electrolyte for use in the electrochemical water splitting cell may be, for example, potassium nitrate ($KNO_3$).

Hereinafter, an organic material decomposition system including the visible light sensitive photocatalyst will be disclosed in further detail.

An organic material decomposition system includes a transparent case, a solution in which an organic material is dissolved in the transparent case, the light sensitive photocatalyst (such as an $Ag_2SiO_3$ photocatalyst powder) dispersed in the solution, and a light source for irradiating white light into the solution through the transparent case. For example, the transparent case may be a PYREX case, and the light source may be a xenon (Xe) lamp. The dispersion of the $Ag_2SiO_3$ photocatalyst powder may be maintained in the solution by, for example, a magnetic agitator.

In an embodiment, the light sensitive photocatalyst is included in a water splitting composition. The water splitting composition may comprise the light sensitive photocatalyst disclosed above; water; and a sacrificial reagent, wherein the sacrificial reagent is one or more selected from $AgNO_3$, $FeCl_3$, $Fe(NO_3)_3$, $Na_2S_2O_8$, $Ce(SO_4)_2$, $HgCl_2$, $Na_3PW_{12}O_{40}$, and $Na_3PMo_{12}O_{40}$.

Hereinafter, water splitting system including the visible light sensitive photocatalyst will be disclosed in further detail.

The water splitting system may comprise a transparent case; an aqueous solution in the transparent case, wherein the aqueous solution comprises the light sensitive photocatalyst; and a light source for irradiating white light into the aqueous solution.

A water decomposition system according to another embodiment includes a transparent case, an aqueous solution in the transparent case, the aqueous solution comprising a sacrificial reagent, an $Ag_2SiO_3$ photocatalyst powder dispersed in the aqueous solution, and a light source for irradiating white light into the aqueous solution through the transparent case. For example, like the organic material decomposition system disclosed above, the transparent case may be a PYREX case, the light source may be a xenon (Xe) lamp, and the dispersion of the $Ag_2SiO_3$ photocatalyst powder may be maintained using, for example, a magnetic agitator. The sacrificial reagent may be at least one selected from $AgNO_3$, $FeCl_3$, $Fe(NO_3)_3$, $Na_2S_2O_8$, $Ce(SO_4)_2$, $HgCl_2$, a polyoxometalate such as $Na_3PW_{12}O_{40}$, and $Na_3PMo_{12}O_{40}$.

EXAMPLE 1

Preparation of $Ag_2SiO_3$ Photocatalyst Powder

An $Ag_2SiO_3$ photocatalyst was synthesized by ion exchange. 1 gram (g) of $BaCO_3$ and 0.3 g of $SiO_2$ were mixed in a mortar for 10 minutes, and then heat treated in an electric furnace under atmospheric conditions at a temperature of 1250° C. for 10 hours to prepare a $BaSiO_3$ powder. The $BaSiO_3$ powder was pulverized in a mortar and mixed with 10 g of an $AgNO_3$ powder. The mixed powder including $BaSiO_3$ and $AgNO_3$ were heated in an electric furnace under atmospheric conditions at a temperature of 300° C. for 20 hours to exchange the Ba ions of $BaSiO_3$ with the Ag ions of $AgNO_3$. After the ion exchange, the mixed powder sample was added to distilled water and stirred for about 30 min to dissolve the residual $AgNO_3$ and $Ba(NO_3)_2$ in the distilled water. Then, the sample was washed three times with distilled water and dried in the dark, thereby completing preparation of an $Ag_2SiO_3$ powder.

EXAMPLE 2

Preparation of $Ag_2SiO_3$ Photocatalyst Film 0.5 g of ethyl cellulose ("EC") was dissolved in 10 g of terpineol in a water bath at a temperature of 60° C. 1 milliliter (mL) of the terpineol mixture including 5 weight percent (wt % 0 of EC was mixed with 2 g of $BaSiO_3$, which is an intermediate product of Example 1, to prepare a $BaSiO_3$ paste. By using a doctor blade, the $BaSiO_3$ paste was applied to a thickness of 10 μM on a glass substrate on which a $SnO_2$:F electrode was deposited (an "FTO substrate"). The FTO substrate on which the $BaSiO_3$ paste was applied was heat treated in an electric furnace under atmospheric conditions at a temperature of 500° C. for 2 hours. An $AgNO_3$ powder was placed on the heat treated $BaSiO_3$ film and heated in an electric furnace under atmospheric conditions at a temperature of 300° C. for 20 hours so as to exchange Ba ions with Ag ions. After the ion exchange, $AgNO_3$ and $Ba(NO_3)_2$ remaining on the FTO substrate sample were dissolved in distilled water. The FTO substrate sample was washed three times with distilled water and dried in the dark, thereby completing production of an FTO substrate coated with an $Ag_2SiO_3$ thick film.

XRD Spectrum: Crystal Structure Confirmation

Figure 2:
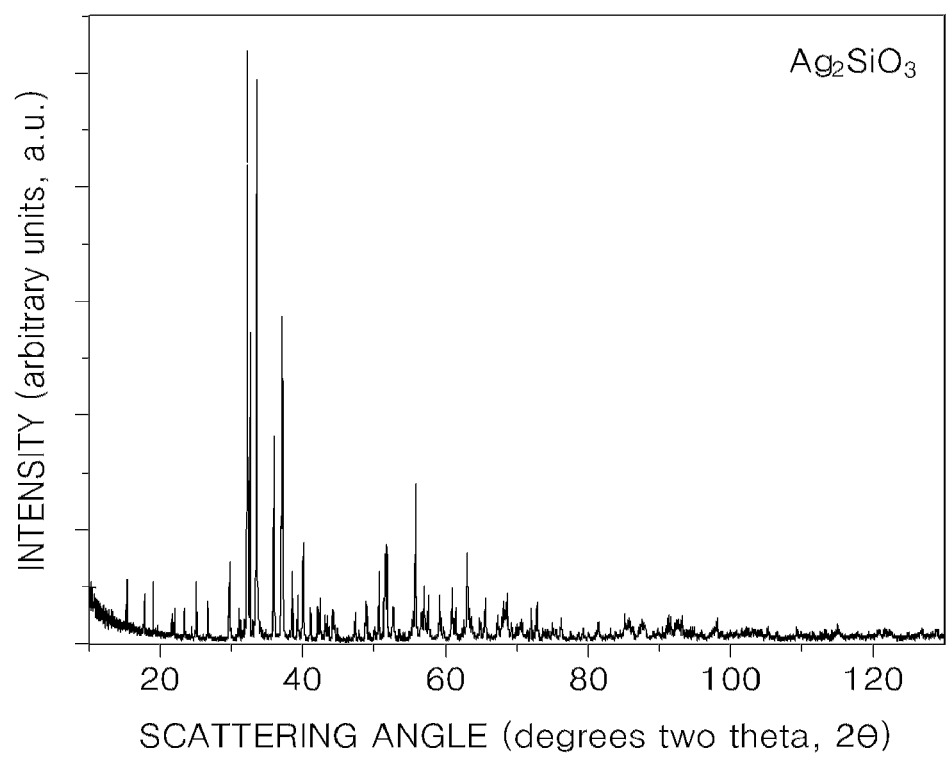
FIG. 2 is a graph of intensity (arbitrary units, a.u.) versus scattering angle (degrees two theta, 2θ) which shows an X-ray diffraction spectrum of $Ag_2SiO_3$ prepared in Example 1.

FIG. 2 shows an X-ray diffraction spectrum of an $Ag_2SiO_3$ powder prepared according to Example 1. The X-ray diffraction spectrum of FIG. 2 was obtained by irradiating with an X-ray having a wavelength of 0.155 nanometer (nm) emitted from a synchrotron (Pohang light source, Pohang, Korea) on to an $Ag_2SiO_3$ powder sample.

Figure 3:
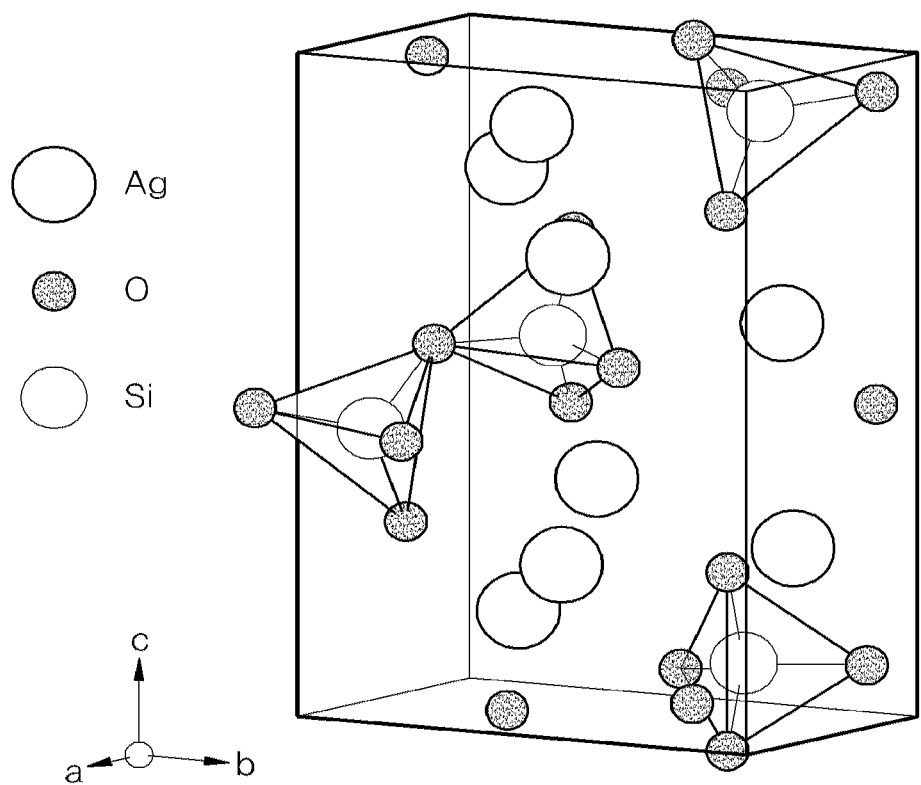
FIG. 3 illustrates a crystal structure of the $Ag_2SiO_3$ confirmed using the X-ray diffraction spectrum of FIG. 2.

FIG. 3 illustrates a crystal structure of the $Ag_2SiO_3$ confirmed using the X-ray diffraction spectrum of FIG. 2. Referring to FIG. 3, the crystal structure of $Ag_2SiO_3$ has the space group ($P2_12_12_1$) and orthorhombic symmetry, and has the lattice constants a=4.53 Å, b=7.11 Å, and c=9.96 Å. Also, distances between adjacent Ag atoms calculated from the crystal structure of $Ag_2SiO_3$ in FIG. 3 include 2.93 Å, 3.01 Å, 3.35 Å, 3.36 Å, 3.56 Å, and 3.60 Å. In consideration that a Van der Waals distance between Ag atoms is 3.44 Å, it was confirmed that the crystal structure of $Ag_2SiO_3$ includes a distance between adjacent Ag atoms that is smaller than the Van der Waals distance. Accordingly, it is understood that a charge carrier mobility may be increased due to overlap of electron orbitals between Ag atoms.

EXAMPLE 3

Production of Electrochemical Water Decomposition Cell

An FTO working electrode on a glass substrate, coated with an $Ag_2SiO_3$ photocatalyst film, a counter electrode including a Pt mesh, and an Ag/AgCl reference electrode were connected to a potentiostat (Parstat 2273, Princeton Applied Research), and 0.1 molar (M) $KNO_3$ was used as an electrolyte.

Mott-Schottky Plot

Figure 4:
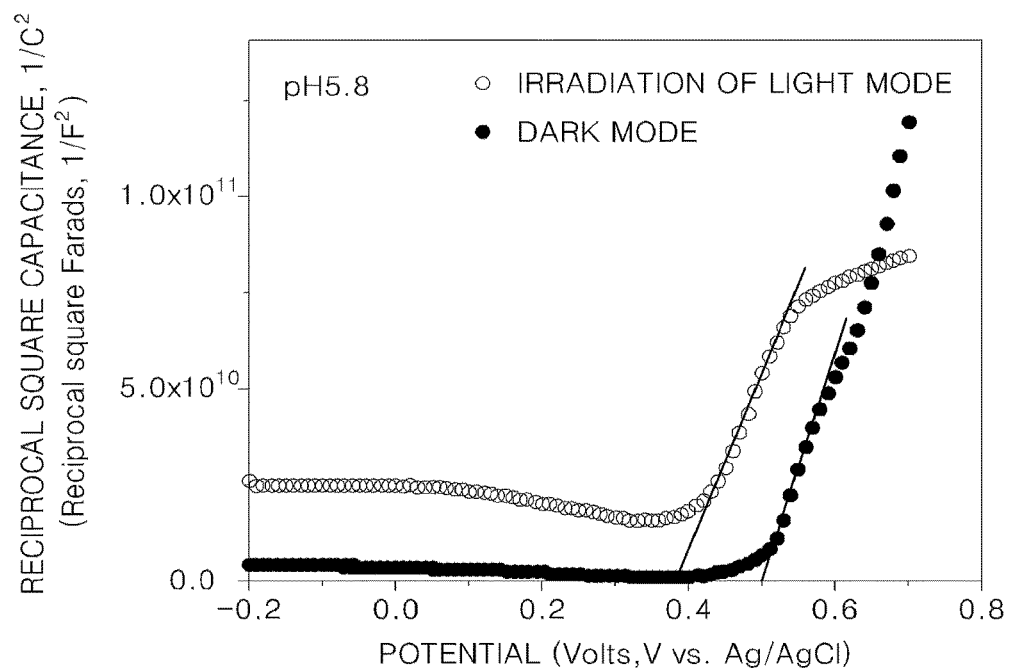
FIG. 4 is a graph of a reciprocal square of the capacitance ($1/C^2$, reciprocal square farads, $1/F^2$) versus potential (Volts, V versus Ag/AgCl) and is a Mott-Schottky plot of the $Ag_2SiO_3$ prepared in Example 2.

FIG. 4 is a Mott-Schottky plot of $Ag_2SiO_3$ at a pH of 5.8. The Mott-Schottky plot of FIG. 4 was obtained using an electrochemical water decomposition cell produced according to Example 3.

FIG. 4 shows results obtained in a dark mode by measuring a reciprocal of a square of a capacitance of a surface of the working electrode, while applying a voltage of −0.2 to 0.8 Volts (V) to the reference electrode without irradiation of light. In the dark mode, an x intercept of the Mott-Schottky plot indicates a Fermi energy of $Ag_2SiO_3$, and this Fermi energy value is converted into a potential of about 1.0 eV with respect to the hydrogen reduction potential (Normal Hydrogen Electrode, NHE) at a pH of 0. From a slope of the results obtained in the dark mode of the Mott-Schottky plot, it was confirmed that a potential difference between the Fermi energy and a conduction band was about 0.2 eV.

FIG. 4 also shows results obtained in a light irradiation mode by measuring a reciprocal of a square of the capacitance of the surface of the working electrode while white light is irradiated on to the working electrode with a xenon (Xe) lamp (66924-450 W, Newport) while applying a voltage of −0.2 to 0.8 V to the reference electrode. From the results obtained in the light irradiation mode shown in the Mott-Schottky plot of FIG. 4, it was confirmed that when electrons were excited by irradiation of light, a potential of the Fermi energy was lowered.

Absorption Spectra

Figure 5:
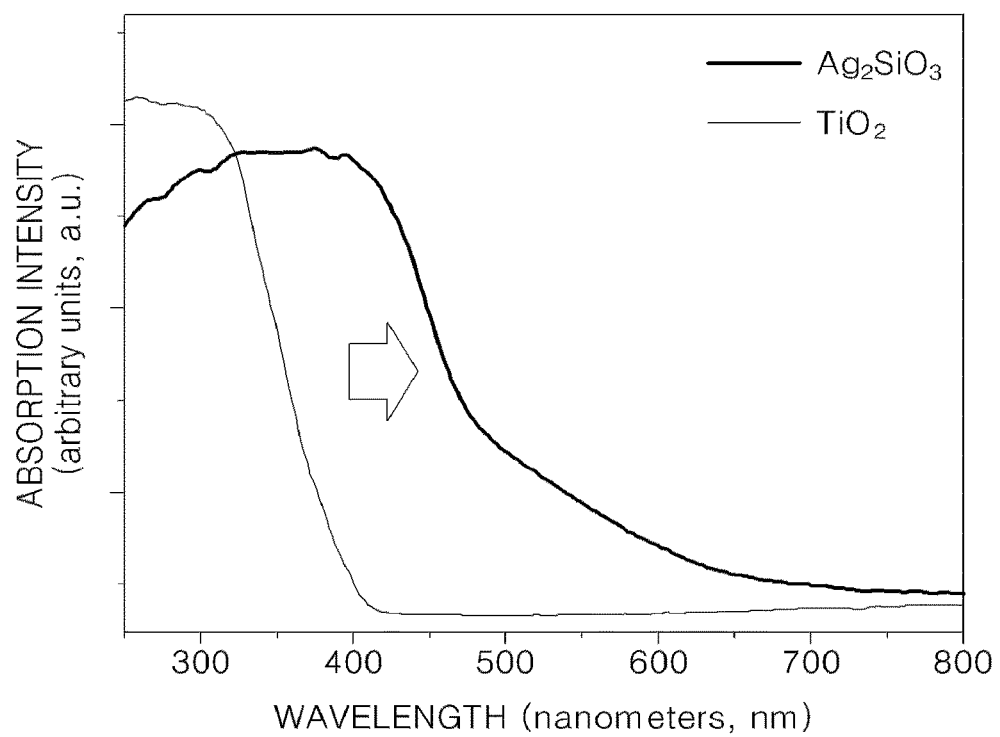
FIG. 5 is a graph of absorption intensity (arbitrary units, a.u.) versus wavelength (nanometers, m) which shows optical absorption spectra of the $Ag_2SiO_3$ prepared in Example 1 and $TiO_2$.

FIG. 5 shows optical absorption spectra of the $Ag_2SiO_3$ of Example 1 and $TiO_2$. The optical absorption spectra of FIG. 5 were obtained by using an ultraviolet light—visible light absorption spectroscope (U-3310, Hitachi) equipped with an integration sphere. Referring to the optical absorption spectra of FIG. 5, it was confirmed that an absorption band of $Ag_2SiO_3$ is located at a higher wavelength than that of $TiO_2$. A band gap energy of $Ag_2SiO_3$ was measured from the optical absorption spectra of FIG. 5 and a result thereof was about 2.64 eV.

Band Energy Diagram

Figure 6:
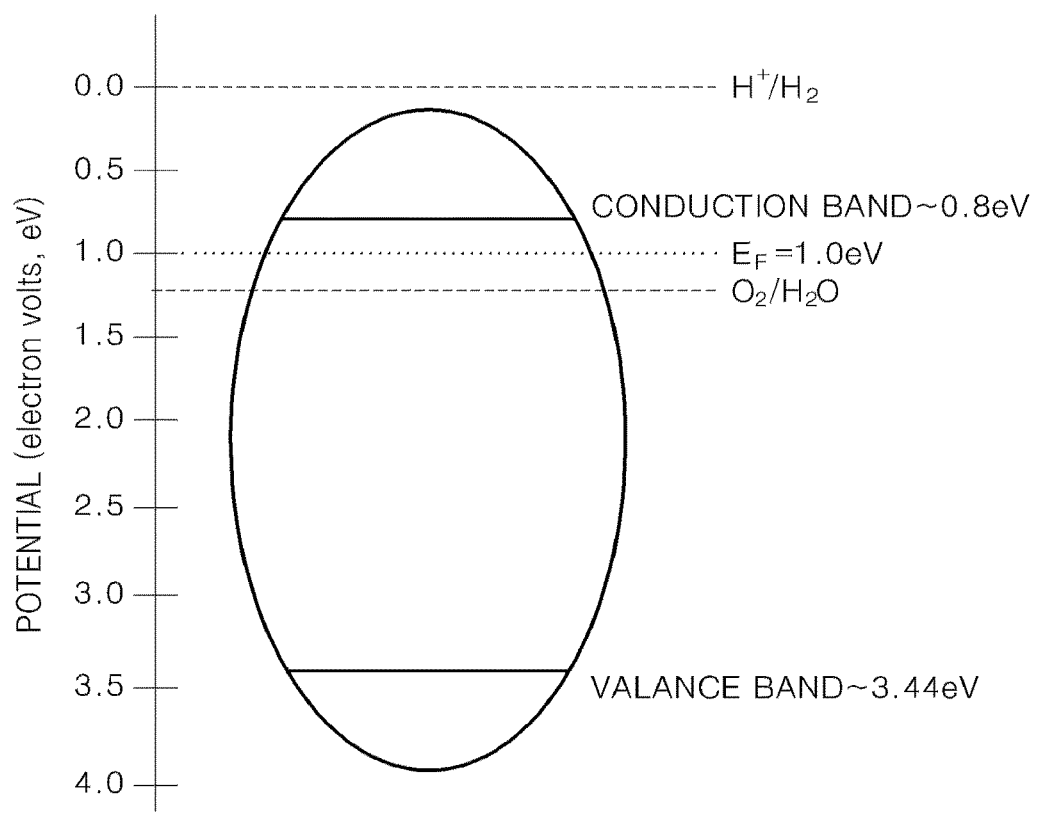
FIG. 6 shows valence and conduction band energy levels in electron volts (eV) of $Ag_2SiO_3$, and reduction and oxidation potentials of water.

FIG. 6 shows valence and conduction band energy levels of $Ag_2SiO_3$ and reduction and oxidation potentials of water.

In FIG. 6, the band energy levels of $Ag_2SiO_3$ were measured from the Mott-Schottky plot of FIG. 4 and the optical absorption spectra of FIG. 5.

Referring to FIG. 6, with reference to a reference hydrogen reduction potential (NHE), a conduction band energy level of $Ag_2SiO_3$ is about 0.8 eV, and a valence band energy level of $Ag_2SiO_3$ is about 3.44 eV. Accordingly, a bandgap energy of $Ag_2SiO_3$ is about 2.64 eV, and thus the $Ag_2SiO_3$ absorbs blue to yellowish green visible light. Since the valence band energy level of $Ag_2SiO_3$ is about 3.44 electron volts (eV) (vs NHE), which is about 2.2 eV higher than an oxidation potential of water, that is, 1.23 eV (vs NHE), $Ag_2SiO_3$ has a high overpotential with respect to a reaction for generating oxygen from water. However, since the conduction band level of $Ag_2SiO_3$ is about 0.8 V higher than a reduction potential of hydrogen, $Ag_2SiO_3$ does not reduce hydrogen.

Current and Voltage Characteristics

Figure 7:
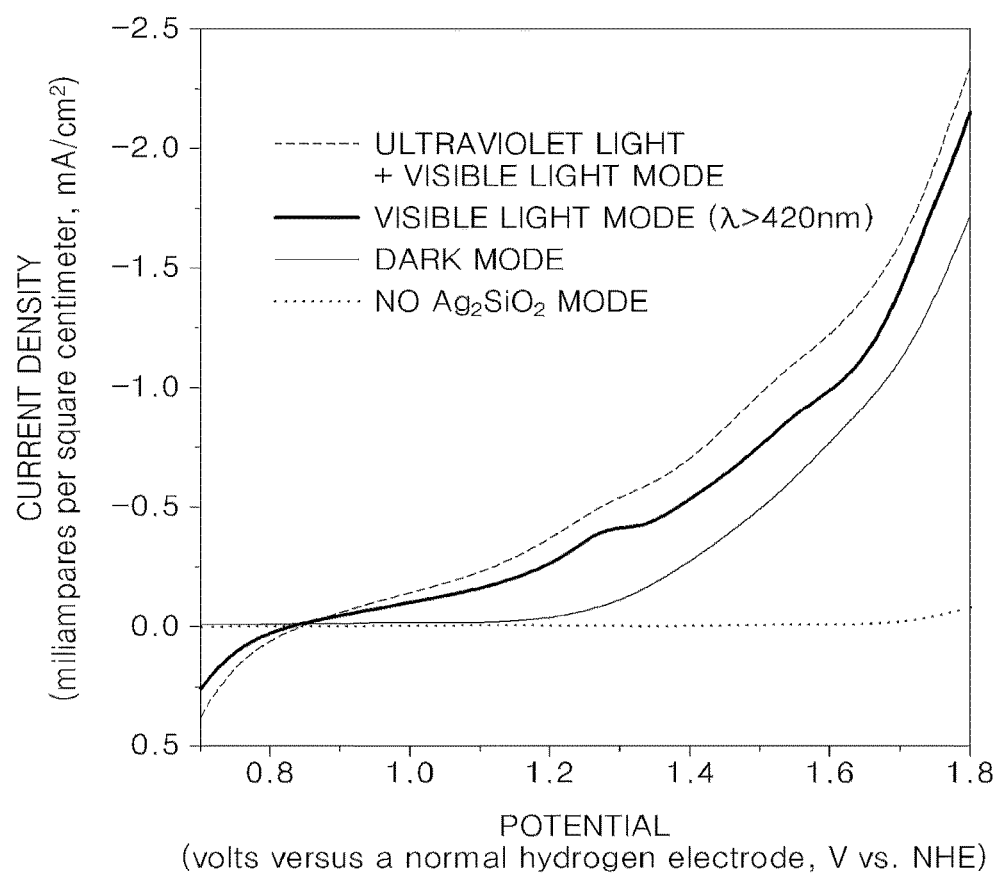
FIG. 7 is a graph of current density (milliamperes per square centimeter, mA/cm$^2$) versus potential (Volts versus a normal hydrogen electrode, V vs. NHE) which shows a graph of current density versus voltage for an electrochemical cell including $Ag_2SiO_3$ as an oxidation electrode and Pt as a counter electrode.

FIG. 7 shows a current-voltage graph obtained by measuring current density when a voltage is applied to an electrochemical cell. Referring to FIG. 7, current-voltage characteristics were evaluated when the $Ag_2SiO_3$ photocatalyst was used without irradiation of light (i.e., dark mode), when the $Ag_2SiO_3$ photocatalyst was used with irradiation of only visible light (i.e., visible light mode), when the $Ag_2SiO_3$ photocatalyst was used with irradiation of visible light and ultraviolet light (i.e., visible light+ultraviolet light mode), and when the $Ag_2SiO_3$ photocatalyst was not used (i.e., no $Ag_2SiO_3$ mode).

First, when the $Ag_2SiO_3$ photocatalyst was used without irradiation of light (i.e., dark mode), it was confirmed that at a voltage of about 1.2 V, water was decomposed and the current density was positive. At 1.8 V, electrical current was near zero for an electrode on which the $Ag_2SiO_3$ photocatalyst was not coated (i.e., no $Ag_2SiO_3$ mode), and it was confirmed that $Ag_2SiO_3$ functions at 1.8 V as a water splitting catalyst for reducing an overpotential needed for water splitting even when light was not present. When visible light having a wavelength of 420 nm or more was irradiated to an $Ag_2SiO_3$ working electrode (i.e., visible light mode), it was confirmed that an onset voltage for water decomposition was decreased to 0.88 V and a current density related to water decomposition was increased. When ultraviolet light was additionally irradiated in addition to the visible light (i.e., visible light+ultraviolet light mode), the onset voltage was not changed but an amount of charge generated was increased, leading to an increase in the current density.

Figure 8:
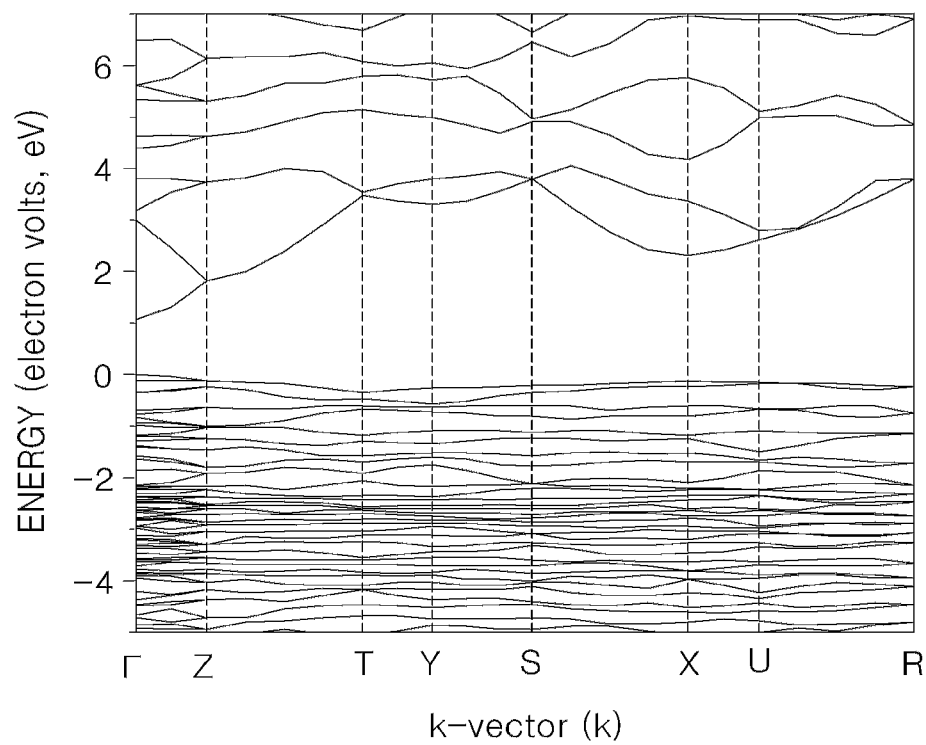
FIG. 8 is a graph of energy (electron volts, eV) versus k-vector showing an electric energy-momentum diagram ("E-K diagram") of $Ag_2SiO_3$.
Figure 8:
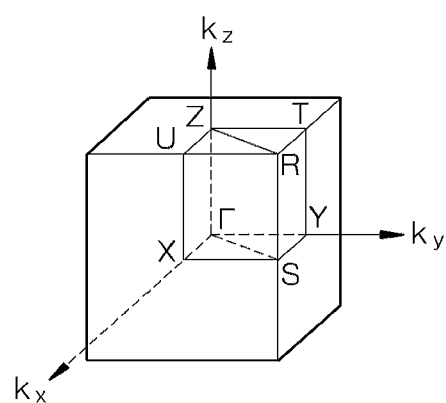

FIG. 8 shows an electronic energy-momentum diagram (i.e., an E-K diagram) of $Ag_2SiO_3$ measured according to a density function theory ("DFT"). Referring to FIG. 8, from an equation of the relationship between an effective mass and a band energy level: $1/m^* = 1/2\pi h^2 (d^2E/dk^2)$, with reference to motion of electrons at Γ, an effective mass of electrons ($m_e$) of $Ag_2SiO_3$ satisfies an equation of $m_e = 0.54 \times m_0$ (wherein $m_0$ is a rest mass of a free electron), and an effective mass of holes ($m_h$) of $Ag_2SiO_3$ satisfies an equation of $m_h = 3.84 \times m_0$. Thus, it was confirmed that in consideration that an effective mass of an electron of rutile titanium dioxide ($TiO_2$) is about $1.5 \times m_0$ and an effective mass of an electrons of anatase titanium dioxide ($TiO_2$) is about $3\text{-}30 \times m_0$, the effective masses of electrons and holes of $Ag_2SiO_3$ are relatively small. Accordingly, it is inferred that the mobility of electrons and holes of $Ag_2SiO_3$ would be very high. Due to high mobility of electrons and holes of a light sensitive photocatalyst including $Ag_2SiO_3$, electrons and holes generated by light absorption move to a surface of the visible light sensitive photocatalyst with a reduced loss, and thus the efficiency of the visible light sensitive photocatalyst is increased.

EXAMPLE 4

1 g of an $Ag_2SiO_3$ powder prepared according to Example 1 was dispersed in an aqueous solution prepared by dissolving 1.0 milligram (mg) of Rhodamine B dye in 200 cubic centimeters (cc) of distilled water in a PYREX case.

Comparative Example 1

1 g of a $TiO_2$ powder (Degussa, p-25) was dispersed in an aqueous solution prepared by dissolving 1.0 mg of Rhodamine B dye in 200 cc of distilled water in a Pyrex case.

Decomposition of Rhodamine B

Figure 9:
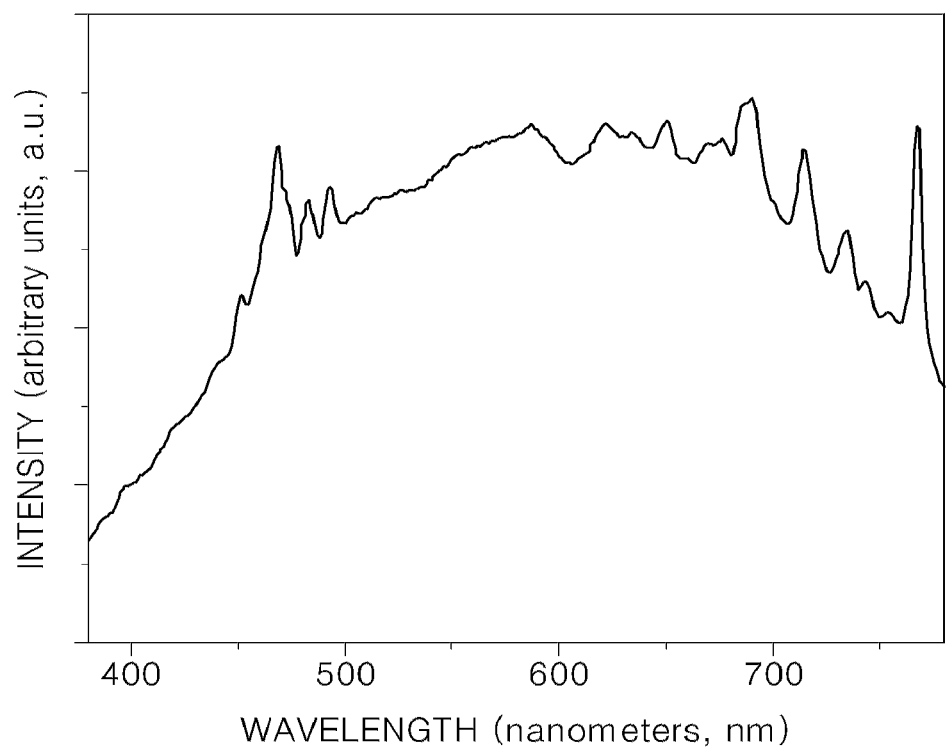
FIG. 9 is a graph of intensity (arbitrary units, a.u.) versus wavelength (nanometers, m) and is an emission spectrum of an Xe lamp between about 380 to about 780 nanometers (nm) used in analyzing characteristics of a photocatalyst.

Decomposition of Rhodamine B was observed while irradiating light to samples prepared according to Example 4 and Comparative Example 1 from a xenon (Xe) lamp without an optical filter. Referring to FIG. 9, a xenon (Xe) lamp emits light similar to natural light, and may emit light of an ultraviolet light region and a visible light region.

Figure 10A:
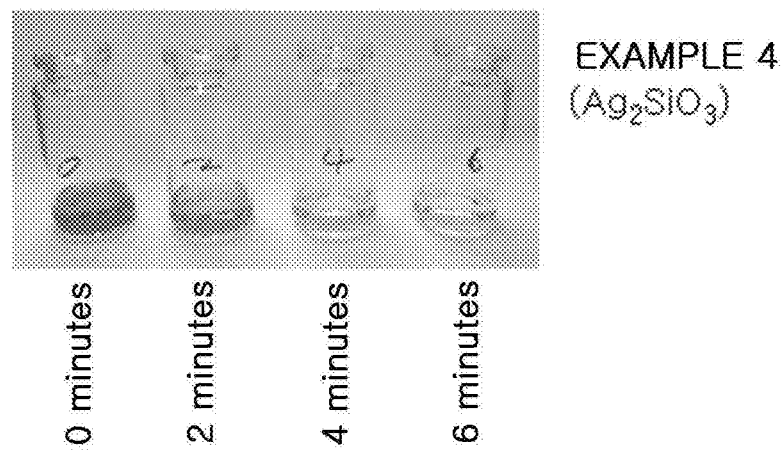
FIG. 10A is a picture showing aqueous Rhodamine B decolarization according to Example 4.
Figure 10B:
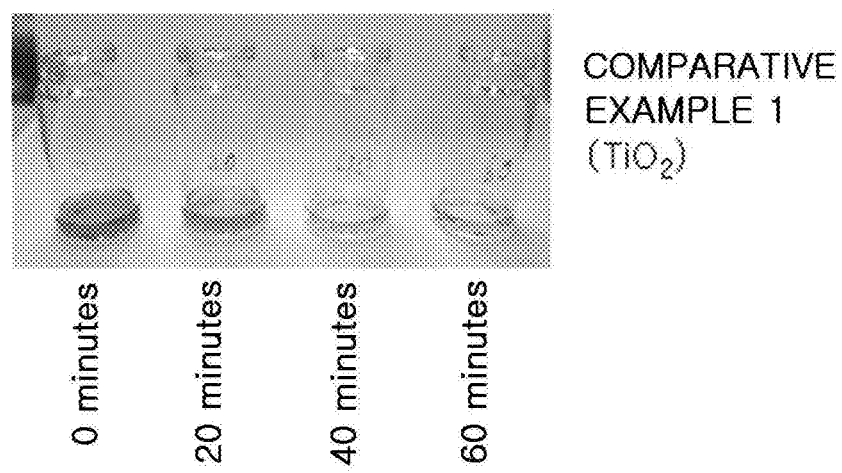
FIG. 10B is a picture showing aqueous Rhodamine B decolarization according to Comparative Example 1.

FIG. 10A shows a picture to confirm color change of the mixed aqueous solution prepared according to Example 4 over time, and FIG. 10B shows a picture to confirm color change of the mixed aqueous solution prepared according to Comparative Example 1 over time. Referring to FIG. 10A, it is confirmed that the mixed aqueous solution prepared according to Example 4 was completely decolorized 6 minutes after the irradiation of light from the xenon lamp. Also, it is confirmed that after 60 minutes the mixed aqueous solution prepared according to Comparative Example 1 was completely decolorized.

Figure 11:
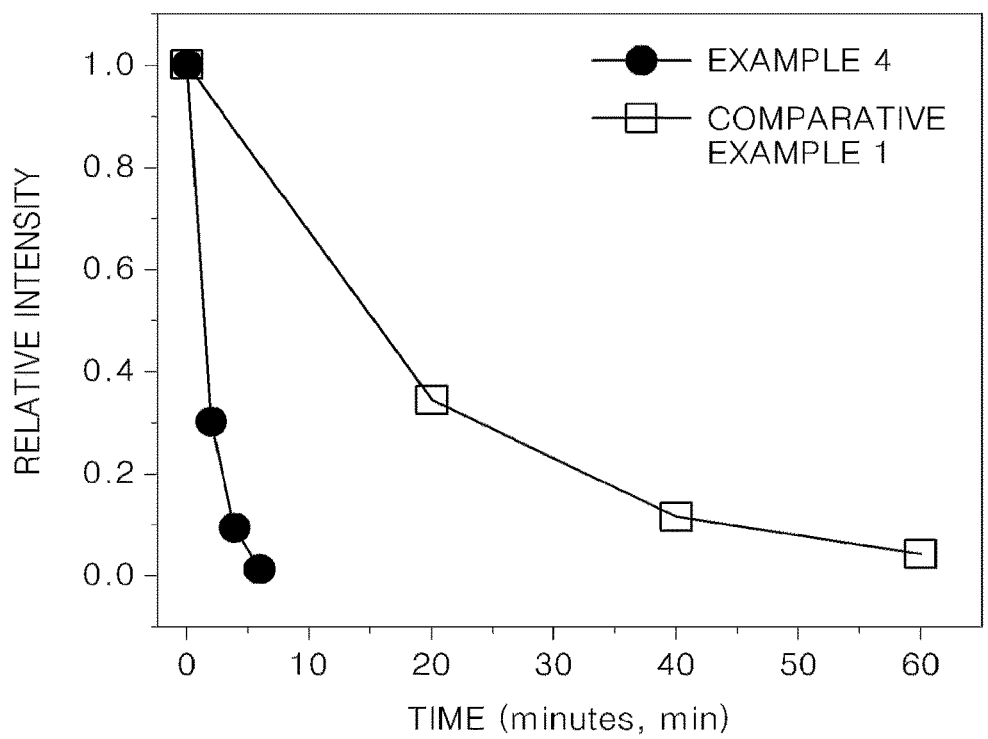
FIG. 11 is a graph of relative intensity versus time (minutes) which shows a graph of absorption intensities of the Rhodamine B aqueous solution of Example 4 and the Rhodamine B aqueous solution of Comparative Example 1 according to photolysis time.

FIG. 11 is a graph showing a change of absorption intensities of the Rhodamine B aqueous solution of Example 4 and the Rhodamine B aqueous solution of Comparative Example 1 after the irradiation of light from the xenon lamp over time. The absorption intensities were measured by using an ultraviolet light-visible light absorption spectroscope (CARY 5000, Varian Tech.). The absorption intensity of each of the mixed aqueous solutions over time was normalized with the absorption intensity of each of the mixed aqueous solutions at the initial time of the irradiation of light. Referring to FIG. 11, as illustrated in FIGS. 10A and 10B, the absorption intensity of the Rhodamine B aqueous solution of Example 4 was decreased to less than 1% within 6 minutes, and the absorption intensity of the mixed aqueous solution of Comparative Example 1 was decreased to 3.8% after 60 minutes. A decomposition speed of $Ag_2SiO_3$ with respect to Rhodamine B was about 10 times greater than that of $TiO_2$. Accordingly, it is assumed that if $Ag_2SiO_3$ is used as a photocatalyst for decomposing organic materials, high efficiency may be obtained.

EXAMPLE 5

0.8 g of $AgNO_3$ as a sacrificial reagent was dissolved in 60 cc of distilled water in a PYREX case and then 0.5 g of an $Ag_2SiO_3$ photocatalyst powder was dispersed therein. While a dispersed state of the $Ag_2SiO_3$ photocatalyst powder was maintained by using a magnetic agitator, light was irradiated from an Xe lamp light source equipped with a filter for transmitting light having a wavelength of 420 nm or higher. A kind and amount of gas generated due to photocatalysis were monitored by using gas chromatography (7890A, Agilent).

Figure 12:
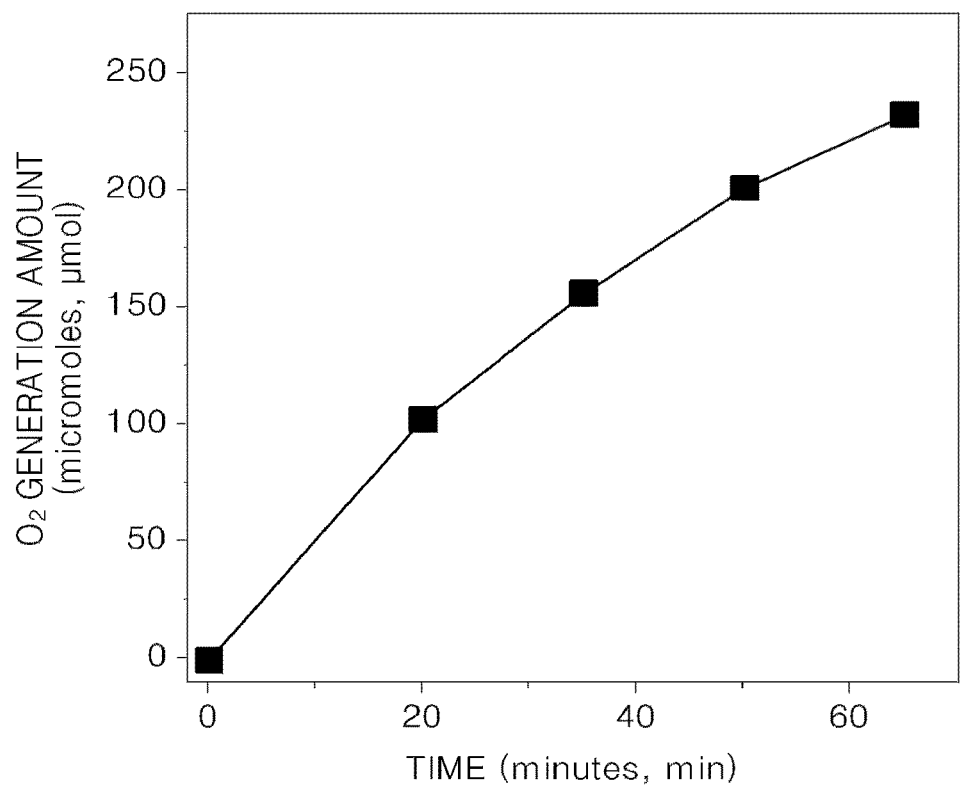
FIG. 12 is a graph of oxygen generation amount (micromoles, μmol) versus time (minutes) which shows a graph of an amount of $O_2$ generated over time as visible light having a wavelength of 420 nm or more was irradiated on the Rhodamine B aqueous solution of Example 4.

From the gas chromatography, it was confirmed that gas generated due to photocatalysis was $O_2$ generated by decomposing water. FIG. 12 shows a graph of an amount of $O_2$ generated due to photocatalysis over time. From FIG. 12, it was confirmed that under the conditions used in Example 5, a water decomposition speed was about 220 micromoles per hour (μmol/h). This speed means that the photocatalyst has a water oxidation decomposition capability equal to or stronger than commercially available photocatalysts, such as $WO_3$, $BiVO_4$, $Ag_3PO_4$, or GaZnON photocatalysts.

EXAMPLE 6

Preparation of $Ag_2(Si_{0.7}Ge_{0.3})O_3$ Photocatalyst Powder

An $Ag_2(Si_{0.7}Ge_{0.3})O_3$ photocatalyst was synthesized by ion exchange. 1 g of $BaCO_3$, 0.21 g of $SiO_2$, and 0.17 g of $GeO_2$ were mixed in a mortar for 10 minutes, and then heated in an electric furnace under atmospheric conditions at a temperature of 1200° C. for 10 hours to obtain a $BaSi_{0.7}Ge_{0.3}O_3$ powder.

Then, the same method was performed as used in Example 1, except that a $BaSi_{0.7}Ge_{0.3}O_3$ powder was used instead of a $BaSiO_3$ powder to exchange Ba ions with Ag ions to obtain an $Ag_2(Si_{0.7}Ge_{0.3})O_3$ powder.

Comparative Example 2

Preparation of $Ag_3PO_4$ Photocatalyst Powder

An $Ag_3PO_4$ photocatalyst was synthesized by co-precipitation. 0.68 g of $AgNO_3$ and 0.66 g of $Na_3PO_3$ were separately dissolved in 100 ml of distilled water, and then the two solutions were mixed together at room temperature to obtain a yellow $Ag_3PO_4$ precipitate. The precipitate was washed three times with clean distilled water and then dried in the dark, thereby completing preparation of an $Ag_3PO_4$ powder.

EXAMPLE 7

0.3 g of an $Ag_2(Si_{0.7}Ge_{0.3})O_3$ powder of Example 6 was dispersed in an aqueous solution prepared by dissolving 1.5 mg of Rhodamine B dye in 100 cc of distilled water in a PYREX case.

Comparative Example 3

0.3 g of an $Ag_3PO_4$ powder of Comparative Example 2 was dispersed in an aqueous solution prepared by dissolving 1.5 mg of Rhodamine B dye in 100 cc of distilled water in a Pyrex case.

Decomposition of Rhodamine B

Decomposition of Rhodamine B was observed in samples prepared according to Example 7 and Comparative Example 3 while irradiating light emitted from a xenon (Xe) lamp equipped with an optical filter for blocking light having a wavelength of less than 430 nm. That is, only light having a wavelength of 430 nm or more, as shown in the xenon (Xe) lamp spectrum of FIG. 9, was used.

Figure 13:
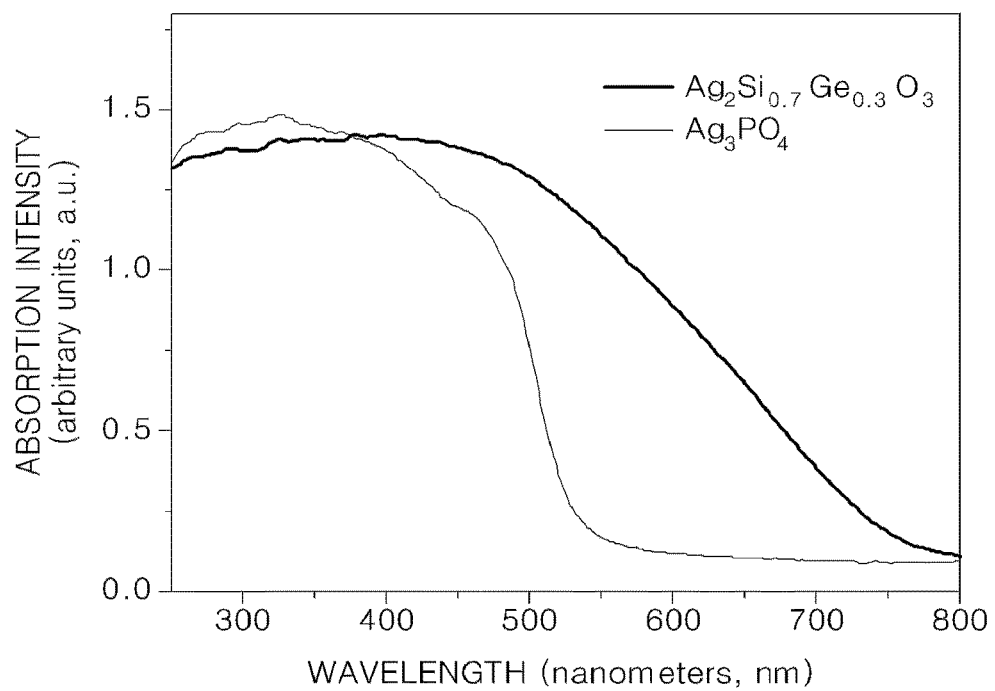
FIG. 13 is a graph of absorption intensity (arbitrary units, a.u.) versus wavelength (nanometers, m) which shows optical absorption spectra of $Ag_2Si_{0.7}Ge_{0.3}O_3$ and $Ag_3PO_4$.

FIG. 13 shows optical absorption spectra of $Ag_2(Si_{0.7}Ge_{0.3})O_3$ and $Ag_3PO_4$. The optical absorption spectra of FIG. 13 were obtained using an ultraviolet-visible light absorption spectroscope (U-3310 spectrophotometer, Hitachi) equipped with an integration sphere (i.e., by absorption spectroscopy). The optical absorption spectra of FIG. 13 show that an absorption band of $Ag_2(Si_{0.7}Ge_{0.3})O_3$ is in a visible light region and includes a greater range of wavelengths than of $Ag_3PO_4$. From the results, it was confirmed that since $Ag_2(Si_{0.7}Ge_{0.3})O_3$ induces photocatalysis in a visible light region and includes a greater range of wavelengths than $Ag_3PO_4$, $Ag_2(Si_{0.7}Ge_{0.3})O_3$ functions as a more efficient photocatalyst than $Ag_3PO_4$.

Figure 14:
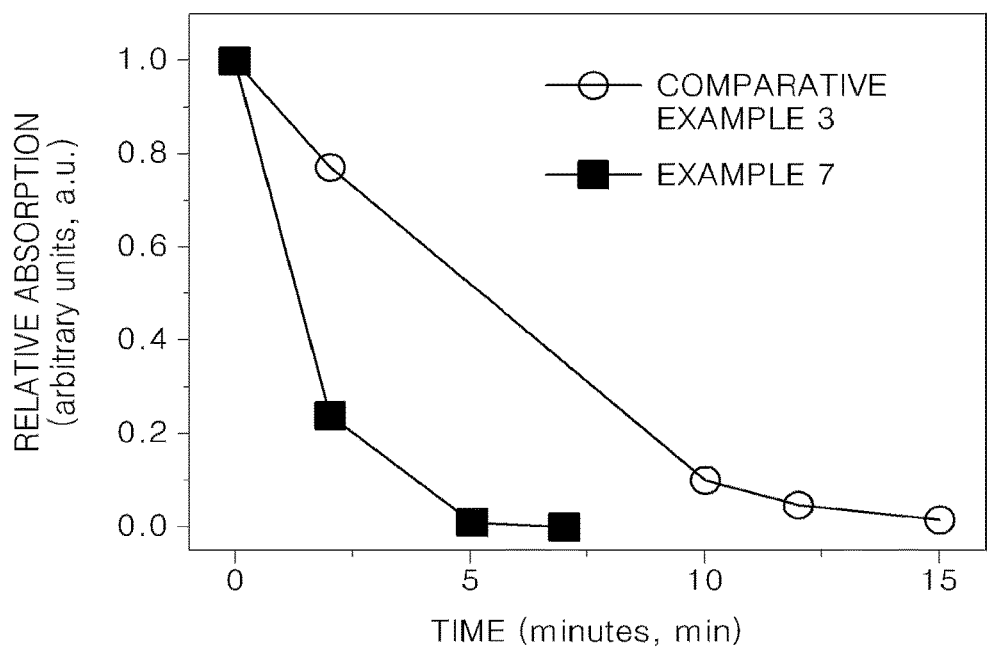
FIG. 14 is a graph of relative absorption (arbitrary units, a.u.) versus time (minutes, min) which shows absorption intensities of an aqueous solution mixed with Rhodamine B prepared according to Example 7 and an aqueous solution mixed with Rhodamine B prepared according to Comparative Example 2 over time.

FIG. 14 is a graph of absorption intensity over time of the Rhodamine B aqueous solution of Example 7 and the Rhodamine B aqueous solution of Comparative Example 3 after the irradiation of light from the xenon lamp. The absorption intensity of each of the mixed aqueous solutions over time was normalized with the absorption intensity of each of the mixed aqueous solutions at the initial time of the irradiation of light.

Referring to FIG. 14, the absorption intensity of the Rhodamine B aqueous solution including the $Ag_2(Si_{0.7}Ge_{0.3})O_3$ powder of Example 7 was decreased to zero within 5 minutes, and the absorption intensity of the mixed aqueous solution of Comparative Example 3 was decreased to about 1% after 15 minutes. Accordingly, it was confirmed that a decomposition speed of $Ag_2(Si_{0.7}Ge_{0.3})O_3$ with respect to Rhodamine B was about 3 times greater than that of $Ag_3PO_4$, which is regarded as the most efficient commercially available visible light absorption oxidation photocatalyst.

EXAMPLE 8

Preparation of $Ag_9(SiO_4)_2NO_3$ Photocatalyst Powder

An $Ag_9(SiO_4)_2NO_3$ photocatalyst was synthesized by ion exchange. 2 g of $BaCO_3$ and 0.3 g of $SiO_2$ were mixed in a mortar for 10 minutes, and then heat treated in an electric furnace under atmospheric conditions at a temperature of 1150° C. for 10 hours to prepare a $Ba_2SiO_4$ powder. The $Ba_2SiO_4$ powder was pulverized in a mortar and mixed with 10 g of an $AgNO_3$ powder. The mixed powder including $Ba_2SiO_4$ and $AgNO_3$ were heated in an electric furnace in air at a temperature of 300° C. for 20 hours to exchange Ba ions of $Ba_2SiO_4$ with Ag ions of $AgNO_3$. After the ion exchange, the mixed powder sample was added to distilled water and stirred for about 30 min to dissolve the residual $AgNO_3$ and $Ba(NO_3)_2$ in the distilled water. Then, the sample was washed three times with distilled water and dried in the dark, thereby completing preparation of an $Ag_9(SiO_4)_2NO_3$ powder.

EXAMPLE 9

0.8 g of $AgNO_3$ as a sacrificial reagent was dissolved in 60 mL of distilled water in a PYREX case and then 0.5 g of an $Ag_9(SiO_4)_2NO_3$ photocatalyst powder was dispersed therein. While a dispersed state of the $Ag_2SiO_3$ photocatalyst powder was maintained by using a magnetic agitator, light was irradiated from an Xe lamp light source equipped with a filter transmitting light having a wavelength of 420 nm or higher. A type and amount of gas generated due to photocatalysis were monitored by gas chromatography (7890A, Agilent).

Figure 15:
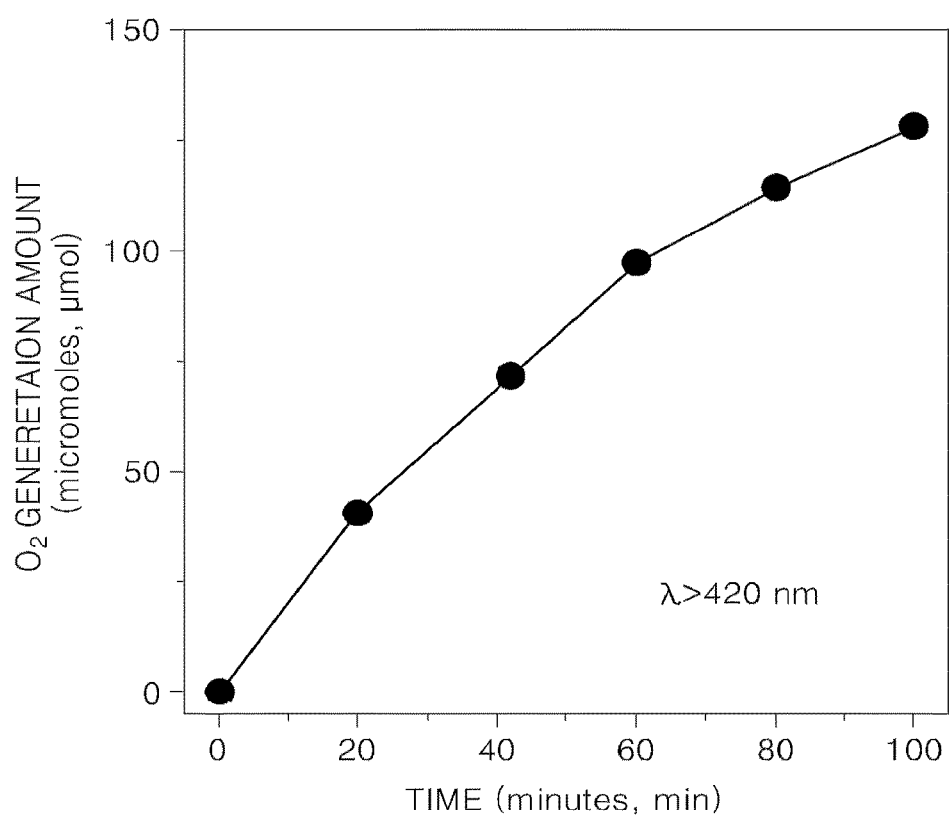
FIG. 15 is a graph of $O_2$ generated (micromoles, μmol) versus time (minutes) which shows a graph of an amount of $O_2$ generated over time as visible light having a wavelength of 420 nm or more was irradiated on the Rhodamine B aqueous solution of Example 8.

From the gas chromatography, it was confirmed that gas generated due to photocatalysis was $O_2$ generated by decomposing water. FIG. 15 shows a graph of an amount of $O_2$ generated due to photocatalysis over time. From FIG. 15, it was confirmed that under the conditions used in Example 9, a water decomposition rate was about 100 micromoles per hour (μmol/h). This rate means that the photocatalyst has a water oxidation decomposition capability equal to or greater than commercially available photocatalysts, such as $WO_3$, $BiVO_4$, $Ag_3PO_4$, or GaZnON photocatalysts.

EXAMPLE 10

1 g of an $Ag_9(SiO_4)_2NO_3$ powder of Example 8 was dispersed in an aqueous solution prepared by dissolving 3.0 mg of Rhodamine B dye in 200 cc of distilled water in a PYREX case.

Figure 16:
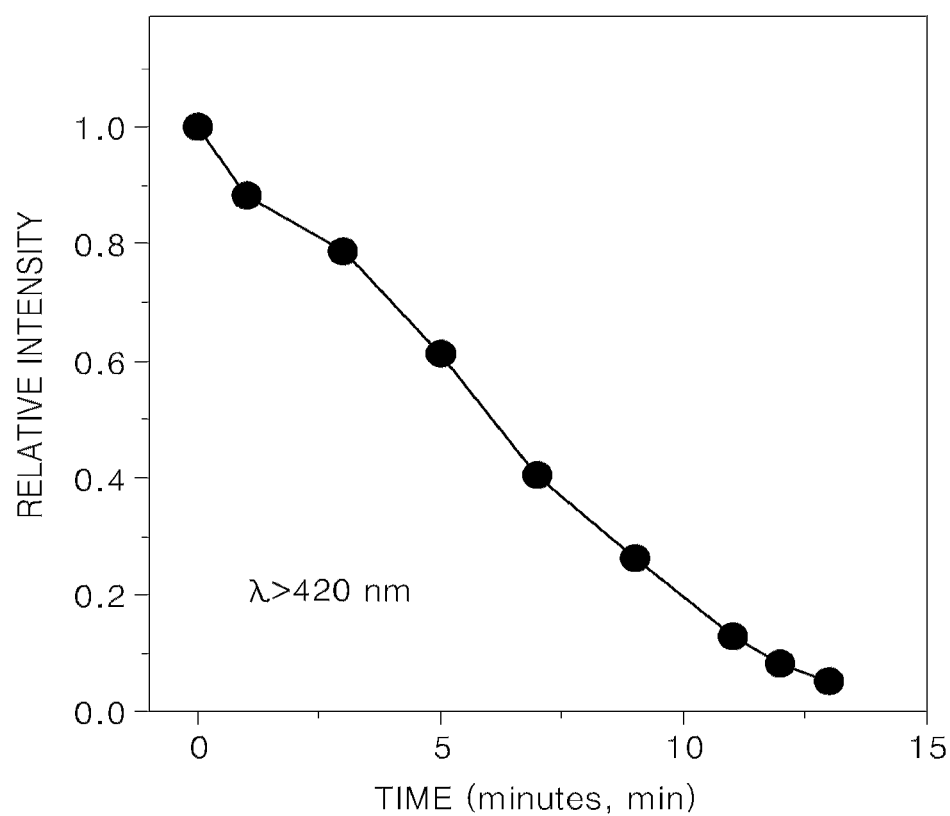
FIG. 16 is a graph of relative intensity versus time (minutes) which shows a graph of absorption intensities of the Rhodamine B aqueous solution of Example 10 according to photolysis time.

Decomposition of Rhodamine B was observed while irradiating light emitted from a xenon (Xe) lamp equipped with an optical filter transmitting light having a wavelength of 420 nm or more. FIG. 16 is a graph of absorption intensity over time of the Rhodamine B aqueous solution after the irradiation of light from the xenon lamp. The absorption intensity was measured using an ultraviolet-visible light absorption spectroscope (CARY 5000, Varian Tech.). The absorption intensity of each of the mixed aqueous solutions over time was normalized with the absorption intensity of each of the mixed aqueous solutions at the initial time of the irradiation of light. Referring to FIG. 16, the absorption intensity of the Rhodamine B aqueous solution including the $Ag_9(SiO_4)_2NO_3$ powder of Example 10 was decreased to less than 1% after 15 minutes.

EXAMPLE 11

0.5 g of ethyl cellulose ("EC") was dissolved in 10 g of terpineol in a water bath at a temperature of 60° C. 1 milliliter (mL) of the terpineol mixture including 5 weight percent (wt % 0 of EC was mixed with 2 g of $Ba_2SiO_4$, which is an intermediate product of Example 8, to prepare a $Ba_2SiO_4$ paste. By using a doctor blade, the $Ba_2SiO_4$ paste was applied to a thickness of 10 μm on a glass substrate on which a $SnO_2$:F electrode was deposited (an "FTO substrate"). The FTO substrate on which the $Ba_2SiO_4$ paste was applied was heat treated in an electric furnace under atmospheric conditions at a temperature of 500° C. for 2 hours. An $AgNO_3$ powder was placed on the heat treated $Ba_2SiO_4$ film and heated in an electric furnace under atmospheric conditions at a temperature of 300° C. for 20 hours so as to exchange Ba ions with Ag ions. After the ion exchange, $AgNO_3$ and $Ba(NO_3)_2$ remaining on the FTO substrate sample were dissolved in distilled water. The FTO substrate sample was washed three times with distilled water and dried in the dark, thereby completing production of an FTO substrate coated with an $Ag_9(SiO_4)_2NO_3$ thick film of about 10 μm.

An FTO working electrode on a glass substrate, coated with an $Ag_9(SiO_4)_2NO_3$ photocatalyst film, a counter electrode including a Pt mesh, and an Ag/AgCl reference electrode were connected to a potentiostat (Parstat 2273, Princeton Applied Research), and 0.1 molar (M) $KNO_3$ was used as an electrolyte.

Figure 17:
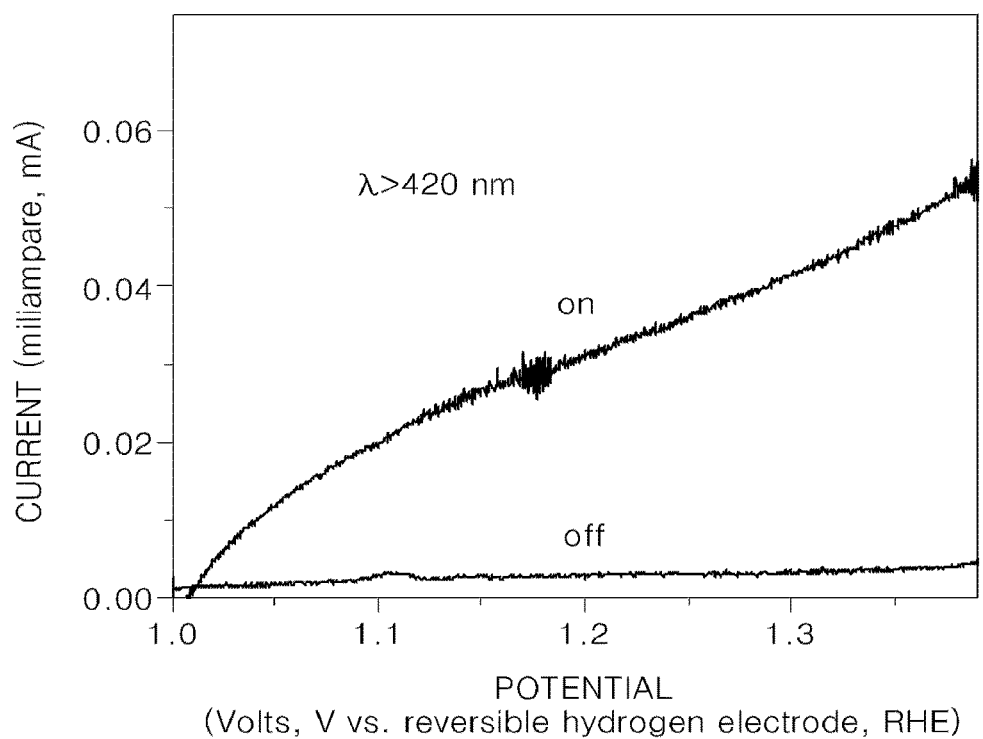
FIG. 17 is a graph of current (milliamperes, mA) versus potential (Volts versus a reversible hydrogen electrode, V vs. RHE) which shows "off" current and "on" current when a voltage is applied to $Ag_9(SiO_4)_2NO_3$ working electrode of an electrochemical cell; and shows that $Ag_9(SiO_4)_2NO_3$ starts to generate photocurrent at 1.0 V vs. RHE and indicates that the $Ag_9(SiO_4)_2NO_3$ electrode is a water oxidation electrode where photocurrent increases as the applied voltage increases.

FIG. 17 is a graph of current (milliamperes, mA) versus potential (Volts versus a reversible hydrogen electrode, V vs. RHE) which shows current as a voltage is applied to $Ag_9(SiO_4)_2NO_3$ working electrode of an electrochemical cell of Example 11. FIG. 17 shows that $Ag_9(SiO_4)_2NO_3$ starts to generate photocurrent at 1.0V vs. RHE, and indicates that $Ag_9(SiO_4)_2NO_3$ electrode is a water oxidation electrode where photocurrent increases as the applied voltage increases.

The visible light sensitive photocatalyst disclosed above may be used to decompose water, or an organic material dissolved in water using solar light. Since oxygen is generated using light, the light sensitive photocatalysts are useful in an oxygen generator, and since the visible light sensitive photocatalysts can decompose an organic material, they may also be used for water purification, e.g., as a purification catalyst in a water purifier. The characteristic of generating oxygen using light is comparable to photo system II of plant photosynthesis, and thus this feature may be used as a key technology for artificial photosynthesis. Accordingly, the visible light sensitive photocatalysts may also be used in artificial photosynthesis for generating an organic material, such as an alcohol and an acetic acid, using only light, water, and carbon dioxide, and without use of a fossil fuel.

As described above, according to an embodiment, the light sensitive photocatalysts are sensitive to visible light, have a band gap energy suitable for absorption of visible light, and an absorption efficiency thereof with respect to visible light is higher than commercially available catalysts. Also, electrons and holes in the photocatalyst have a lower effective mass, and thus the efficiency of electron and hole transfer is improved. Also, since the valence band and the conduction band of the visible light sensitive catalyst both have an energy level which is suitable for decomposing water, the photocatalyst provides a high overpotential with respect to oxidation of water, and thus the photocatalysts may be used as a water decomposition catalyst having high efficiency.

It should be understood that the exemplary embodiments described herein should be considered in a descriptive sense only and not for purposes of limitation. Descriptions of features, advantages, or aspects within each embodiment shall be considered as available for other similar features, advantages or aspects in other embodiments.

What is claimed is:

1. A visible light sensitive photocatalyst film comprising a compound represented by Formula 1 on a substrate:

$$A_{a-x}M^1_xSi_{b-y}M^2_yO_c \quad \text{Formula 1}$$

wherein
A is one or more metals selected from Ag, Cu, and Au,
$M^1$ is one or more metals selected from Li, Na, K, Rb, and Cs,
$M^2$ is one or more metals selected from Ge, Sn, Ti, Zr, and Hf,
$1.7 \leq a \leq 2.3$, $0.7 \leq b \leq 1.3$, $2.7 \leq c \leq 3.3$, $0 \leq x < a$, and $0 \leq y < b$, and the compound of Formula 1 has an orthorhombic crystal structure.

2. The visible light sensitive photocatalyst of claim 1, wherein a band gap energy of the compound of Formula 1 is about 2 to about 3 electron volts.

3. The visible light sensitive photocatalyst of claim 1, wherein an energy level of a valence band of the compound of Formula 1 is about 0.5 to about 3 electron volts higher than an oxidation potential of water.

4. The visible light sensitive photocatalyst of claim 1, wherein the compound of Formula 1 is an n-type semiconductor.

5. The visible light sensitive photocatalyst of claim 1, wherein, in the compound of Formula 1, a distance between adjacent A atoms, a distance between a first A atom and a first $M^1$ atom, or a distance between adjacent $M^1$ atoms is smaller than a corresponding Van der Waals distance therebetween.

6. The visible light sensitive photocatalyst of claim 1, wherein an electron effective mass of the compound of Formula 1 satisfies the inequality $0.3 \times m_0 \leq m_e^* \leq 1.5 \times m_0$, wherein $m_0$ is a rest mass of a free electron and $m_e^*$ is the electron effective mass.

7. The visible light sensitive photocatalyst of claim 1, wherein a hole effective mass of the compound of Formula 1 satisfies the inequality $2 \times m_0 \leq m_h^* \leq 5 \times m_0$, wherein $m_0$ is a rest mass of a free electron and $m_h^*$ is the hole effective mass.

8. The visible light sensitive photocatalyst of claim 1, wherein the compound of Formula 1 is $Ag_2Si_{b-y}Ge_yO_3$, wherein $0.9 \leq b \leq 1.1$ and $0 \leq y < 0.4$.

9. The visible light sensitive photocatalyst of claim 1, wherein the compound of Formula 1 is $Ag_2SiO_3$.

10. The visible light sensitive photocatalyst of claim 8, wherein a distance between adjacent Ag atoms in the compound of Formula 1 is smaller than 3.44 angstroms.

11. A water splitting system comprising:
a transparent case;
an aqueous solution in the transparent case, wherein the aqueous solution comprises the visible light sensitive photocatalyst comprising a compound represented by Formula 1:

$$A_{a-x}M^1_xSi_{b-y}M^2_yO_c \quad \text{Formula 1}$$

wherein
A is one or more metals selected from Ag, Cu, and Au,
$M^1$ is one or more metals selected from Li, Na, K, Rb, and Cs,
$M^2$ is one or more metals selected from Ge, Sn, Ti, Zr, and Hf,
$1.7 \leq a \leq 2.3$, $0.7 \leq b \leq 1.3$, $2.7 \leq c \leq 3.3$, $0 \leq x < a$, and $0 \leq y < b$, and
the compound of Formula 1 has an orthorhombic crystal structure; and
a light source for irradiating white light into the aqueous solution.

12. The water splitting system of claim 11, further comprising a sacrificial reagent in the aqueous solution.

13. The water splitting system of claim 12, wherein the sacrificial reagent is one or more selected from $AgNO_3$, $FeCl_3$, $Fe(NO_3)_3$, $Na_2S_2O_8$, $Ce(SO_4)_2$, $HgCl_2$, $Na_3PW_{12}O_{40}$, and $Na_3PMo_{12}O_{40}$.

14. An organic material decomposition system comprising:
a transparent case,
a solution in the transparent case, the solution comprising an organic material and the visible light sensitive photocatalyst comprising a compound represented by Formula 1:

$$A_{a-x}M^1_xSi_{b-y}M^2_yO_c \quad \text{Formula 1}$$

wherein
A is one or more metals selected from Ag, Cu, and Au,
$M^1$ is one or more metals selected from Li, Na, K, Rb, and Cs,
$M^2$ is one or more metals selected from Ge, Sn, Ti, Zr, and Hf,
$1.7 \leq a \leq 2.3$, $0.7 \leq b \leq 1.3$, $2.7 \leq c \leq 3.3$, $0 \leq x < a$, and $0 \leq y < b$,
the compound of Formula 1 has an orthorhombic crystal structure; and
a light source for irradiating white light into the solution.

15. A method of producing a visible light sensitive photocatalyst, the method comprising:
combining $BaCO_3$ and $SiO_2$ to prepare a $BaSiO_3$;
combining the $BaSiO_3$ and $AgNO_3$ to provide a mixture;

heating and ion-exchanging the mixture to produce the light sensitive photocatalyst represented by Formula 1:

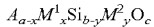     Formula 1 wherein
A is one or more metals selected from Ag, Cu, and Au,
$M^1$ is one or more metals selected from Li, Na, K, Rb, and Cs,
$M^2$ is one or more metals selected from Ge, Sn, Ti, Zr, and Hf,
$1.7 \leq a \leq 2.3$, $0.7 \leq b \leq 1.3$, $2.7 \leq c \leq 3.3$, $0 \leq x < a$, and $0 \leq y < b$, and
the light sensitive photocatalyst of Formula 1 has an orthorhombic crystal structure; and
disposing the light sensitive photocatalyst on a substrate to produce the visible light sensitive photocatalyst film.

16. The method of claim 15, wherein the heating of the mixture comprising $BaSiO_3$ and $AgNO_3$ is conducted in air at a temperature of about 290 to about 350° C. for about 5 to about 100 hours.

17. The method of claim 15, wherein the light sensitive photocatalyst is sensitive to visible light.

18. A method of producing a visible light sensitive photocatalyst film, the method comprising:
preparing a $BaSiO_3$ paste;
disposing the $BaSiO_3$ paste on a substrate;
heat-treating the substrate and the $BaSiO_3$ paste to provide a heat-treated substrate;
disposing $AgNO_3$ on the heat-treated substrate; and
heat-treating the substrate and the $AgNO_3$ to produce the light sensitive photocatalyst on the substrate to produce the light sensitive photocatalyst film,
wherein the visible light sensitive photocatalyst is represented by Formula 1:

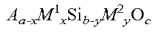     Formula 1 wherein
A is one or more metals selected from Ag, Cu, and Au,
$M^1$ is one or more metals selected from Li, Na, K, Rb, and Cs,
$M^2$ is one or more metals selected from Ge, Sn, Ti, Zr, and Hf,
$1.7 \leq a \leq 2.3$, $0.7 \leq b \leq 1.3$, $2.7 \leq c \leq 3.3$, $0 \leq x < a$, and $0 \leq y < b$, and
the visible light sensitive photocatalyst of Formula 1 has an orthorhombic crystal structure; and
disposing light sensitive photocatalyst on a substrate to produce the visible light sensitive photocatalyst film.

19. The method of claim 18, wherein the preparing of the $BaSiO_3$ paste comprises combining $BaSiO_3$ and a terpineol mixture comprising about 0.1 to about 20 weight percent of ethyl cellulose, based on a total weight of the terpineol mixture.

20. The method of claim 18, wherein the heat-treating of the substrate and the $AgNO_3$ comprises heating the substrate and the $AgNO_3$ in air at a temperature of about 290 to about 350° C. for about 5 to about 100 hours.

21. The method of claim 18, wherein the $AgNO_3$ is a powder.

22. The method of claim 18, wherein the light sensitive photocatalyst film is sensitive to visible light and is $Ag_2SiO_3$.

23. A visible light sensitive photocatalyst comprising:
a substrate; and a visible light sensitive photocatalyst disposed on the substrate, the visible light sensitive photocatalyst comprising
a first metal, wherein the first metal is one or more metals selected from Li, Na, K, Rb, and Cs;
a second metal, wherein the second metal is one or more metals selected from Ag, Cu, and Au;
a third metal, wherein the third metal is one or more metals selected from Ge, Sn, Ti, Zr, and Hf;
Si; and oxygen,
wherein each mole of the photocatalyst comprises
x moles of the first metal,
(a-x) moles of the second metal,
y moles of the third metal,
(b-y) moles of the Si, and
c moles of the oxygen, and
wherein $1.7 \leq a \leq 2.3$, $0.7 \leq b \leq 1.3$, $2.7 \leq c \leq 3.3$, $0 \leq x < a$, and $0 \leq y < b$, and
the photocatlyst has an orthorhombic crystal structure.

24. The visible light sensitive photocatalyst of claim 23, wherein the photocatalyst is $Ag_2Si_{b-y}Ge_yO_3$, wherein $0.9 \leq b \leq 1.1$ and $0 \leq y < 0.4$.

25. The visible light sensitive photocatalyst of claim 24, wherein the photocatalyst is $Ag_2SiO_3$.

26. A water splitting composition comprising:
a visible light sensitive photocatalyst represented by Formula 1:

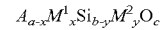     Formula 1 wherein
A is one or more metals selected from Ag, Cu, and Au,
$M^1$ is one or more metals selected from Li, Na, K, Rb, and Cs,
$M^2$ is one or more metals selected from Ge, Sn, Ti, Zr, and Hf,
$1.7 \leq a \leq 2.3$, $0.7 \leq b \leq 1.3$, $2.7 \leq c \leq 3.3$, $0 \leq x < a$, and $0 \leq y < b$, and
the visible light sensitive photocatalyst of Formula 1 has an orthorhombic crystal structure;
water; and
a sacrificial reagent, wherein the sacrificial reagent is one or more selected from $AgNO_3$, $FeCl_3$, $Fe(NO_3)_3$, $Na_2S_2O_8$, $Ce(SO_4)_2$, $HgCl_2$, $Na_3PW_{12}O_{40}$, and $Na_3PMo_{12}O_{40}$.

* * * * *

UNITED STATES PATENT AND TRADEMARK OFFICE
CERTIFICATE OF CORRECTION

| | |
|---|---|
| PATENT NO. | : 9,718,695 B2 |
| APPLICATION NO. | : 13/517766 |
| DATED | : August 1, 2017 |
| INVENTOR(S) | : Tae-gon Kim et al. |

It is certified that error appears in the above-identified patent and that said Letters Patent is hereby corrected as shown below:

In Claim 2, Line 1, "The visible light sensitive photocatalyst of claim 1" should be --The visible light sensitive photocatalyst film of claim 1--

In Claim 3, Line 1, "The visible light sensitive photocatalyst of claim 1" should be --The visible light sensitive photocatalyst film of claim 1--

In Claim 4, Line 1, "The visible light sensitive photocatalyst of claim 1" should be --The visible light sensitive photocatalyst film of claim 1--

In Claim 5, Line 1, "The visible light sensitive photocatalyst of claim 1" should be --The visible light sensitive photocatalyst film of claim 1--

In Claim 6, Line 1, "The visible light sensitive photocatalyst of claim 1" should be --The visible light sensitive photocatalyst film of claim 1--

In Claim 7, Line 1, "The visible light sensitive photocatalyst of claim 1" should be --The visible light sensitive photocatalyst film of claim 1--

In Claim 8, Line 1, "The visible light sensitive photocatalyst of claim 1" should be --The visible light sensitive photocatalyst film of claim 1--

In Claim 9, Line 1, "The visible light sensitive photocatalyst of claim 1" should be --The visible light sensitive photocatalyst film of claim 1--

In Claim 10, Line 1, "The visible light sensitive photocatalyst of claim 8" should be --The visible light sensitive photocatalyst film of claim 8--

Signed and Sealed this
Nineteenth Day of September, 2017

Joseph Matal
*Performing the Functions and Duties of the
Under Secretary of Commerce for Intellectual Property and
Director of the United States Patent and Trademark Office*